US010237144B2

(12) United States Patent
Yoon et al.

(10) Patent No.: US 10,237,144 B2
(45) Date of Patent: Mar. 19, 2019

(54) QUALITY OF USER EXPERIENCE ANALYSIS

(71) Applicant: T-Mobile USA, Inc., Bellevue, WA (US)

(72) Inventors: Jong Sung Yoon, Sammamish, WA (US); Jie Hui, Mercer Island, WA (US); Kranthi Sontineni, Renton, WA (US); Samson Kim-Sun Kwong, Bellevue, WA (US); Kevin Lau, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 280 days.

(21) Appl. No.: 14/803,769

(22) Filed: Jul. 20, 2015

(65) Prior Publication Data

US 2015/0326447 A1    Nov. 12, 2015

Related U.S. Application Data

(63) Continuation-in-part of application No. 14/183,300, filed on Feb. 18, 2014, now Pat. No. 9,538,409, which
(Continued)

(51) Int. Cl.
*H04L 12/24* (2006.01)
*H04L 12/26* (2006.01)
(Continued)

(52) U.S. Cl.
CPC ...... *H04L 41/5025* (2013.01); *H04L 41/5009* (2013.01); *H04L 43/10* (2013.01); *H04W 24/10* (2013.01); *H04W 24/04* (2013.01)

(58) Field of Classification Search
None
See application file for complete search history.

(56) References Cited

U.S. PATENT DOCUMENTS

| 6,058,102 A | 5/2000 | Drysdale et al. |
| 7,143,006 B2 | 11/2006 | Ma et al. |

(Continued)

FOREIGN PATENT DOCUMENTS

| JP | 2009260652 | 11/2009 |
| WO | WO2014166523 | 10/2014 |
| WO | WO2015053788 | 4/2015 |

OTHER PUBLICATIONS

The PCT Search Report and Written Opinion dated Aug. 24, 2016 for PCT application No. PCT/US2016/033577, 11 pages.
(Continued)

*Primary Examiner* — Alex Skripnikov
(74) *Attorney, Agent, or Firm* — Lee & Hayes, P.C.

(57) ABSTRACT

The techniques described herein involve analysis of client device Quality of Experience diagnostic files including an operations log or diagnostic files for a client device. The client device Quality of Experience diagnostic files may be generated by a client device and sent to a network node for analysis. The diagnostic files may be analyzed to determine device Key Performance Indicators and a device Quality of Experience, and to determine a root cause of a network problem (such as dropped calls) leading to a diminished Quality of Experience. In some embodiments, the diagnostic files may be aggregated to form a database of aggregated diagnostics, which can be used to further analyze a network to determine the root cause of a network problem. In some embodiments, the aggregated diagnostics may be indexed according to location, time, device type, device problem, or access technology.

20 Claims, 26 Drawing Sheets

Related U.S. Application Data is a continuation-in-part of application No. 13/738,799, filed on Jan. 10, 2013, now Pat. No. 9,237,474.

(60) Provisional application No. 62/168,468, filed on May 29, 2015, provisional application No. 61/719,929, filed on Oct. 29, 2012.

(51) Int. Cl.
*H04W 24/10* (2009.01)
*H04W 24/04* (2009.01)

(56) References Cited

U.S. PATENT DOCUMENTS

| | | | |
|---|---|---|---|
| 7,292,537 B2 | 11/2007 | Charcranoon | |
| 7,380,264 B2 | 5/2008 | Potrebic | |
| 7,424,526 B1 | 9/2008 | Hansen et al. | |
| 7,436,778 B1 | 10/2008 | Iannaccone et al. | |
| 7,496,040 B2 | 2/2009 | Seo | |
| 7,577,701 B1 | 8/2009 | Johns et al. | |
| 7,577,736 B1 | 8/2009 | Ovenden | |
| 7,760,653 B2 | 7/2010 | Poletto | |
| 7,761,272 B1 | 7/2010 | Janneck et al. | |
| 7,782,793 B2 | 8/2010 | Olesinski et al. | |
| 7,904,079 B1 | 3/2011 | Lundy et al. | |
| 7,916,649 B2 | 3/2011 | Buvaneswari et al. | |
| 7,916,653 B2 | 3/2011 | Firestone et al. | |
| 7,929,512 B2 | 4/2011 | Malomsoky et al. | |
| 7,936,688 B2 | 5/2011 | Klotz et al. | |
| 8,005,012 B1 | 8/2011 | Aybay et al. | |
| 8,095,640 B2 | 1/2012 | Guingo et al. | |
| 8,179,799 B2 | 5/2012 | Dolisy | |
| 8,213,323 B1 | 7/2012 | Papagiannaki | |
| 8,355,316 B1 | 1/2013 | Lushear et al. | |
| 8,370,369 B2 | 2/2013 | Veres et al. | |
| 8,374,102 B2 | 2/2013 | Luft et al. | |
| 8,477,772 B2 | 7/2013 | Gerber et al. | |
| 8,527,627 B2 | 9/2013 | Gerber et al. | |
| 8,601,113 B2 | 12/2013 | Dolisy | |
| 8,631,052 B1* | 1/2014 | Shilane | G06F 17/30156 707/825 |
| 8,665,733 B2 | 3/2014 | Eskicioglu et al. | |
| 8,850,578 B2 | 9/2014 | French et al. | |
| 8,879,415 B2 | 11/2014 | Labovitz et al. | |
| 2001/0050903 A1 | 12/2001 | Vanlint | |
| 2005/0163047 A1 | 7/2005 | McGregor et al. | |
| 2006/0176824 A1* | 8/2006 | Laver | H04L 41/00 370/241 |
| 2007/0129086 A1* | 6/2007 | Toone | H04W 24/00 455/456.5 |
| 2009/0149143 A1 | 6/2009 | Rokusek et al. | |
| 2010/0142457 A1* | 6/2010 | Chun | H04W 72/1284 370/329 |
| 2010/0165836 A1 | 7/2010 | Wahlqvist et al. | |
| 2010/0169961 A1 | 7/2010 | Huh et al. | |
| 2010/0325267 A1 | 12/2010 | Mishra et al. | |
| 2012/0009896 A1 | 1/2012 | Bandyopadhyay et al. | |
| 2012/0309320 A1 | 12/2012 | Thyagarajan et al. | |
| 2013/0109336 A1 | 5/2013 | Jackson et al. | |
| 2013/0143561 A1 | 6/2013 | Nuss et al. | |
| 2013/0166730 A1 | 6/2013 | Wilkinson | |
| 2013/0316701 A1 | 11/2013 | Xu et al. | |
| 2014/0086073 A1 | 3/2014 | Baykal et al. | |
| 2014/0087716 A1 | 3/2014 | Vaderna et al. | |
| 2014/0099970 A1 | 4/2014 | Siomina et al. | |
| 2014/0113656 A1* | 4/2014 | Schmidt | H04W 24/10 455/456.2 |
| 2014/0119196 A1 | 5/2014 | Hui et al. | |
| 2014/0130111 A1 | 5/2014 | Nulty et al. | |
| 2014/0160941 A1 | 6/2014 | Hui et al. | |
| 2014/0229614 A1 | 8/2014 | Aggarwal et al. | |
| 2014/0337871 A1 | 11/2014 | Garcia De Blas et al. | |
| 2015/0163047 A1 | 6/2015 | Zhang | |
| 2015/0373565 A1 | 12/2015 | Safavi | |
| 2016/0065419 A1* | 3/2016 | Szilagyi | H04L 41/5067 709/224 |
| 2016/0112894 A1 | 4/2016 | Lau et al. | |
| 2016/0352599 A1 | 12/2016 | Hui et al. | |

OTHER PUBLICATIONS

The PCT Search Report and Written Opinion dated Apr. 26, 2017 for PCT application No. PCT/US2016/067782, 12 pages.
Final Office Action for U.S. Appl. No. 14/183,300, dated Oct. 26, 2015, Jie Hui, "Quality of User Experience Analysis", 50 pages.
Final Office Action for U.S. Appl. No. 13/738,799, dated Dec. 26, 2014, Jie Hui, "Network Device Trace Correlation", 18 pages.
Office Action for U.S. Appl. No. 13/738,799, dated Jun. 17, 2015, Jie Hui, "Network Device Trace Correlation", 20 pages.
Office Action for U.S. Appl. No. 13/738,799, dated Aug. 21, 2014, Jie Hui, "Network Device Trace Correlation", 15 pages.
The PCT Search Report and Written Opinion dated Feb. 24, 2014 for PCT application No. PCT/US13/65984, 10 pages.
Office Action for U.S. Appl. No. 14/183,300, dated Jul. 13, 2015, Jie Hui, "Quality of User Experience Analysis", 42 pages.
Office Action for U.S. Appl. No. 15/235,987, dated Nov. 20, 2017, Jie Hui, "Quality of User Experience Analysis", 27 pages.
Office Action for U.S. Appl. No. 15/235,987, dated May 11, 2018, Hui, "Quality of User Experience Analysis", 40 pages.
Office Action for U.S. Appl. No. 14/984,714, dated May 18, 2018, Lau et al, "Contextual Quality of User Experience Analysis Using Equipment Dynamics", 11 pages.
Extended European Search Report dated Dec. 18, 2018 for European Patent Application No. 16803994.9, 7 pages.

\* cited by examiner

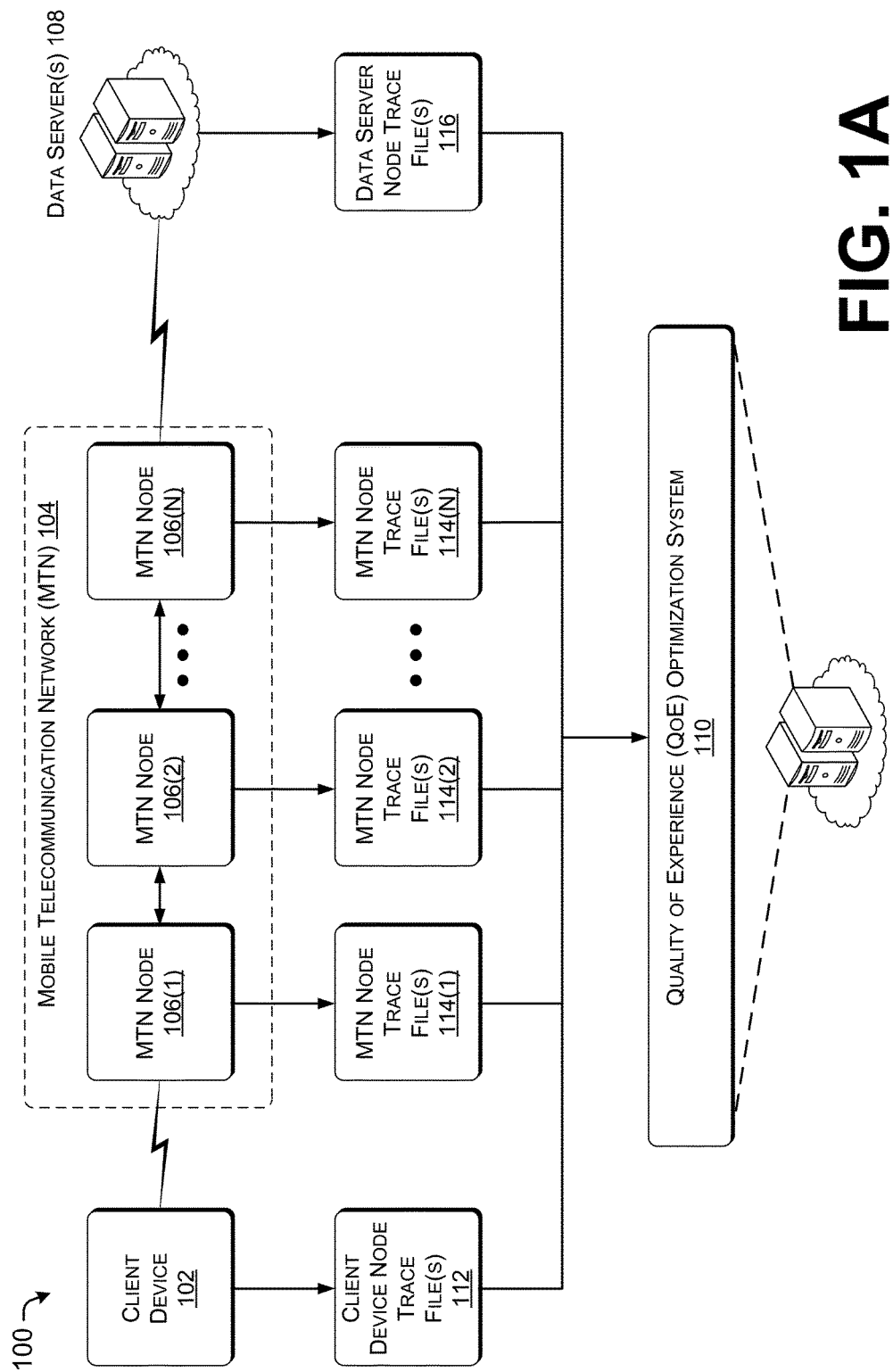

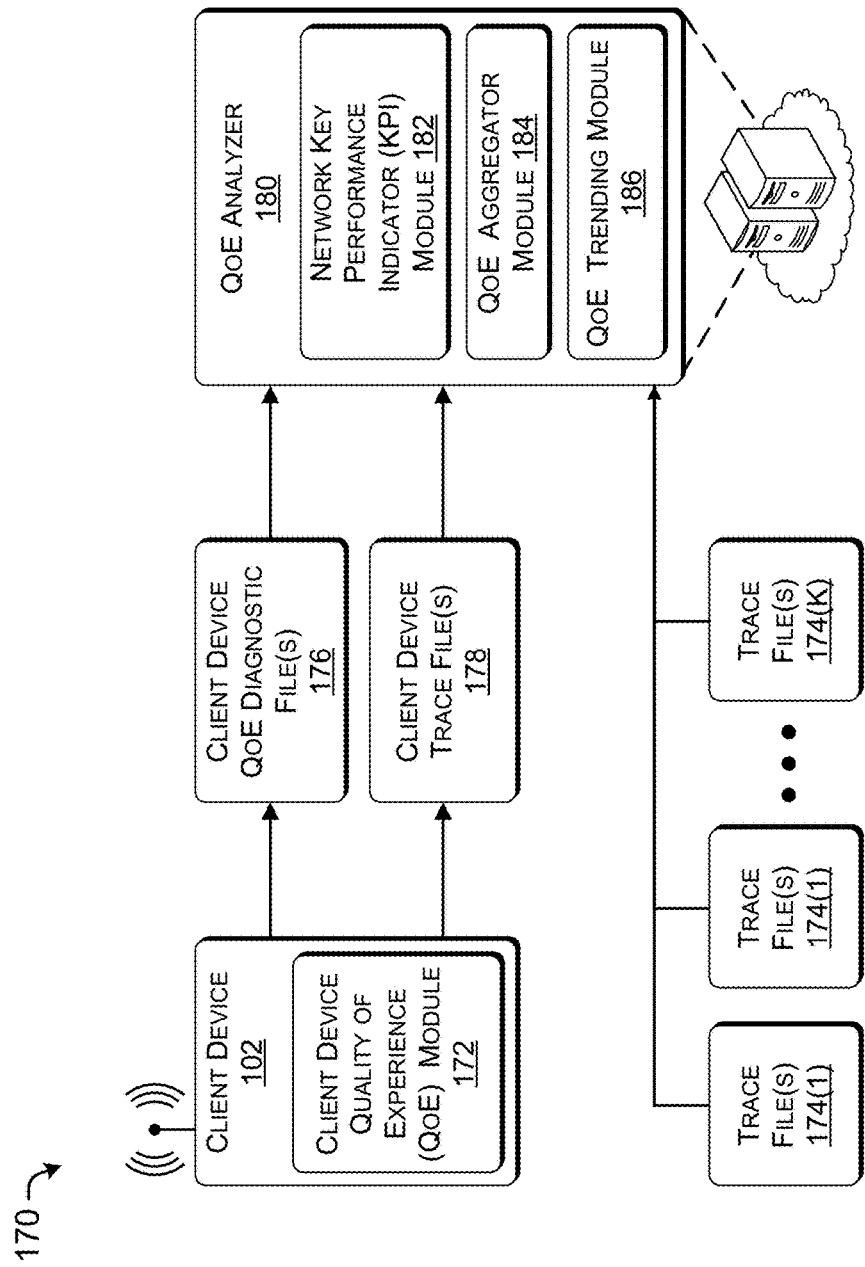

300 ↘

| HEADER 302 | FIELD 1 | FIELD 2 | FIELD N | PAYLOAD 304 |

TRACE IDENTIFICATION (ID)
306

| NODE IDENTIFIER 310 ||
|---|---|
| TRACES 312 | TIMING INFORMATION 314 |
| TRACE ID 1 | TIMESTAMP 1 |
| TRACE ID 2 | TIMESTAMP 2 |
| TRACE ID 3 | TIMESTAMP 3 |
| TRACE ID 4 | TIMESTAMP 4 |
| TRACE ID 5 | TIMESTAMP 5 |
| TRACE ID N | TIMESTAMP N |

FIG. 3B

TEXTUAL REPRESENTATION 1700

| Transition Info | Avg Time | Power | Message |
|---|---|---|---|
| PCH > FACH = 12 | 0.163 | Up | CU |
| FACH > DCH = 13 | 0.220 | Up | RBR |
| FACH > PCH = 14 | 0.007 | Down | CU / PCR |
| FACH > FACH = 1 | 0.176 | Even | CU |
| DCH > FACH = 14 | 1.113 | Down | RBR |

FIG. 17

QUALITY OF USER EXPERIENCE ANALYSIS

PRIORITY APPLICATION(S)

This patent application claims priority filing benefit from U.S. Provisional Patent Application No. 62/168,468, filed May 29, 2015. This patent is a continuation-in-part of U.S. patent application Ser. No. 14/183,300, filed on Feb. 18, 2014, which is a continuation-in-part of U.S. patent application Ser. No. 13/738,799, filed on Jan. 10, 2013, which claims priority filing benefit from U.S. Provisional Patent Application No. 61/719,929, filed Oct. 29, 2012. Application Nos. 62/168,468, U.S. Ser. Nos. 14/183,300, 13/738,799, and 61/719,929 are hereby incorporated by reference, in their entirety.

BACKGROUND

Modern telecommunication systems include heterogeneous mixtures of second, third, and fourth generation (2G, 3G, and 4G) cellular-wireless access technologies, which may be cross-compatible and may operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies.

The infrastructure that makes up the modern telecommunications networks comprises multiple different components or devices (herein referred to as nodes) that are configured to generate, transmit, receive, relay, and/or route data packets so that data services can be requested by, and provided to, user equipment (UE) subscribed to a plan offered by one or more service providers or network communication providers that implement the telecommunications networks.

However, the data services and/or data communications provided via the nodes may often experience problems causing service degradation due to the vast amount of users and UEs accessing and requesting data via the telecommunications networks. For example, problems causing service degradation may be associated with data traffic congestion due to a high transfer demand for digital content (i.e., data transfer overload), and this may lead to data packet loss, packet queuing delay, an inability to establish a connection and other data communication and connection problems. These problems, if not addressed by a service provider or a network communication provider, degrade a network's Quality of Service (QoS) and an end user's Quality of User Experience (QoE) at the UE.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

FIG. 1A depicts an example environment where trace files can be collected from a plurality of nodes and correlated to identify network optimization opportunities, in accordance with embodiments of the disclosure.

FIG. 1C depicts an example environment where client device QoE diagnostic files and trace files may be collected from a client device, trace files can be collected from a network, and QoE analysis may be performed, in accordance with embodiments of the disclosure.

FIG. 3A depicts an example data packet that may be logged in a trace file, in accordance with embodiments of the disclosure.

FIG. 3B depicts an example trace file, in accordance with embodiments of the disclosure.

FIG. 17 is an example of a textual representation of performance metrics associated with communication engaged in by a device.

DETAILED DESCRIPTION

Figure 1B:
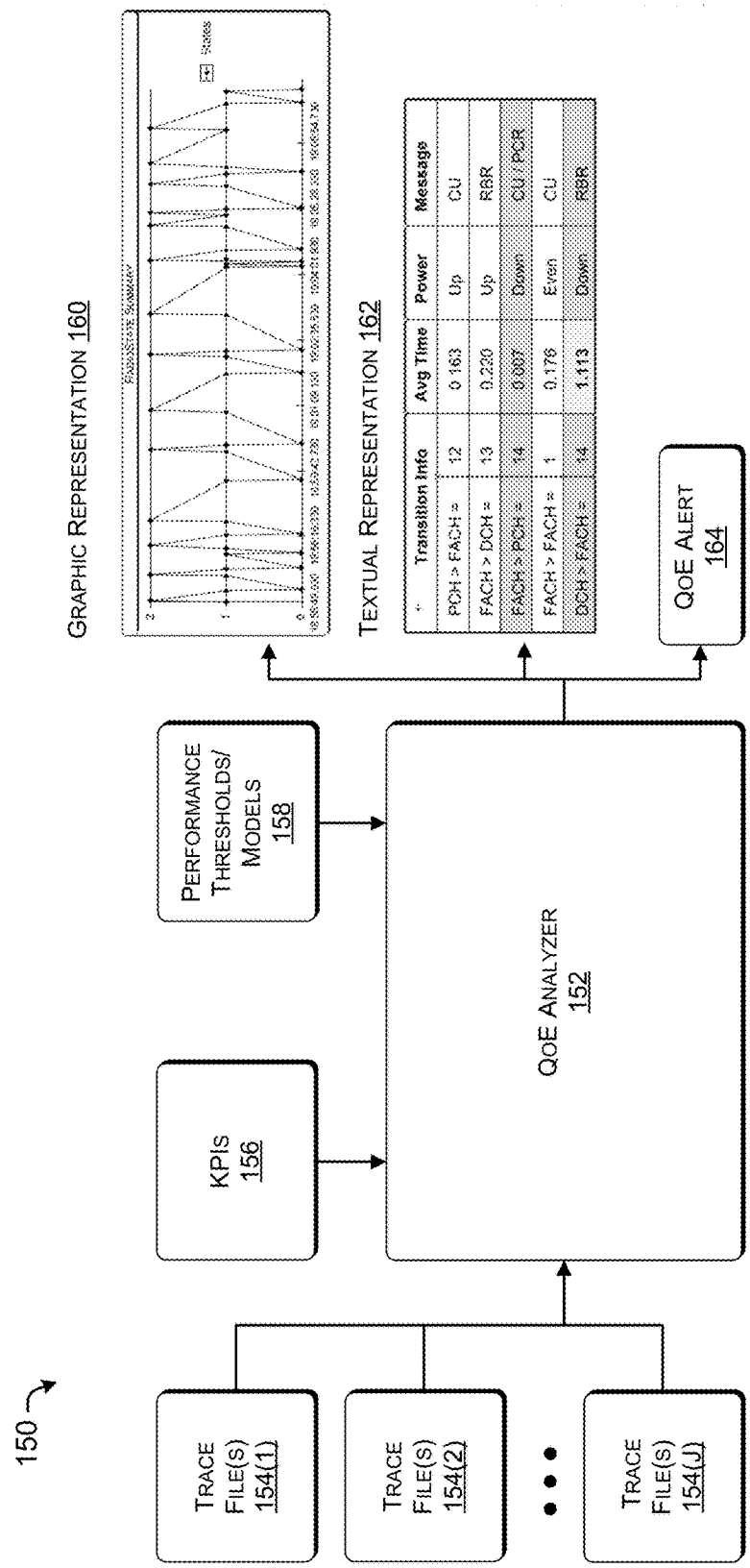
FIG. 1B depicts an example of part of an architecture of a QoE optimization system, in accordance with embodiments of the disclosure.

The techniques described herein present opportunities for service providers and/or network providers to optimize the QoE for data services by determining, using a broader network-based approach, the root cause of problems causing a service degradation (e.g., what problem is occurring, why the problem is occurring, where in the telecommunications network the problem is occurring). To determine the root cause of the problems, the techniques may collect different trace files from multiple different nodes in the telecommunications network (or from a communication interface between two nodes in the telecommunications network) or from multiple or single layers of a communication protocol stack of one of the devices. Each trace file includes a log of identifications for numerous different data packets that have been generated, received, transmitted, relayed, and/or routed via the node in the telecommunications network, and each trace file log entry may be associated with a timestamp. Once collected, the techniques may correlate the different trace files from the multiple different nodes to identify, using a broader network-based analysis, service optimization opportunities. Also or instead, the techniques may correlate data from different layers of a communication protocol stack of one of the devices, or may simply determine performance metrics for data from a specific layer of a specific device. For example, after correlating the trace files and determining that QoE has experienced a certain level of degradation, the techniques may provide an alert notification and a recommendation for optimization so that remedial actions may be implemented to address the root cause of the problems.

In various embodiments, the techniques provide the alert notification and recommendation to a network administrator when the trace file correlation and analysis determines that a key performance indicator (KPI) is not satisfying a minimum service level or service goal associated with QoE. The network administrator may then initiate the remedial actions. In alternative embodiments, the collection of the trace files, the correlation and analysis of the traces files and the implementation of the remedial actions may be performed automatically via a preset network configuration when service levels or service goals are not being satisfied.

In some embodiments, a client device may collect diagnostics regarding the client device, such as an operations log or reports for various individual components of the client device. The diagnostics may be filtered and/or combined to generate client device QoE diagnostic files, which may be sent to a network node for analysis. In some embodiments, a QoE analyzer operating at the network node may analyze the client device QoE diagnostic files to determine device KPIs, a device QoE, and/or to determine a root cause of a problem (such as dropped calls) in the network or device leading to a diminished QoE. In some embodiments, the QoE diagnostic files and/or the KPIs determined from the QoE diagnostic files may be aggregated to form a database of aggregated QoE diagnostics or aggregated KPIs, which may be used to further analyze a network to determine the root cause of a problem. For example, root cause analysis may be performed within the boundary of device KPIs for a single call, aggregated calls from a single device, or aggregated calls from multiple devices. In some embodiments, the QoE diagnostic files and/or KPIs may be indexed according to location, time, device type, device problem, or access technology.

FIG. 1A depicts an illustrative environment 100 for collecting multiple trace files from different nodes that exchange data packets using a telecommunications network. To this end, the environment 100 may include a client device 102 (considered as a node herein), a mobile telecommunications network (MTN) 104 that includes multiple MTN nodes 106(1) . . . 106(N), one or more data servers 108, and a Quality of Experience (QoE) optimization system 110. Moreover, the environment 100 illustrates trace files that are logged at each node. For example, the client device 102 is associated with one or more client device node trace files 112, and the MTN nodes 106(1) . . . 106(N) are each associated with one or more MTN node trace files 114(1) . . . 114(N). In various embodiments, the data servers 108 may each be associated with one or more data server node trace files 116.

The client device 102 may also be referred to as a UE, as mentioned above. Thus, client devices 102 may include, but are not limited to, smart phones, mobile phones, cell phones, tablet computers, portable computers, laptop computers, personal digital assistants (PDAs), electronic book devices, handheld gaming units, personal media player devices, wearable devices, or any other portable electronic devices that may generate voice and/or digital data, request voice and/or digital data over the MTN 104, receive voice and/or digital data over the MTN 104, and/or exchange voice and/or digital data over the MTN 104.

The MTN 104 may be configured to implement one or more of the second, third, and fourth generation (2G, 3G, and 4G) cellular-wireless access technologies discussed above. Thus, the MTN 104 may implement GSM, UMTS, and/or LTE/LTE Advanced telecommunications technologies. Different types of MTN nodes 106(1) . . . 106(N) in the GSM, UMTS, LTE, LTE Advanced, and/or HSPA+ telecommunications technologies may include, but are not limited to, a combination of: base transceiver stations BTSs (e.g., NodeBs, Enhanced-NodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), or any other data traffic control entity configured to communicate and/or route data packets between the client device 102 and the data servers 108. The MTN nodes 106(1) . . . 106(N) may be configured with hardware and software that generates and/or logs an entry in the MTN node trace files 114(1) ... 114(N). While FIG. 1A illustrates an MTN 104, it is understood in the context of this document, that the techniques discussed herein may also be implemented in other networking technologies, such as nodes that are part of a wide area network (WAN), metropolitan area network (MAN), local area network (LAN), neighborhood area network (NAN), personal area network (PAN), or the like.

In various embodiments, each trace entry includes an identification associated with a data packet that is communicated through an interface for the MTN nodes 106(1) ... 106(N) or associated with a data packet routed by the MTN nodes 106(1) ... 106(N), as further discussed herein. In various embodiments, some of the MTN nodes 106(1) ... 106(N) may be part of a core network (e.g., backhaul portion, carrier Ethernet) that is configured to access an IP-based network that provides data communications services (e.g., so that clients can access information at data servers 108). The data servers 108 may be owned and/or operated by web-based content providers, including, but not limited to: Bing®, Facebook®, Twitter®, Netflix®, Hulu®, YouTube®, Pandora®, iTunes®, Google Play®, Amazon Store®, CNN®, ESPN®, and the like.

In various embodiments, the MTN 104 may be configured to exchange data packets between the client device 102 and the data servers 108 using wired and/or wireless links. Moreover, the MTN 104 may be configured to determine a communications path or "pipe" so that the data packets can be routed and exchanged accordingly.

The data services and data access applications discussed in this document may include, but are not limited to, web browsing, video streaming, video conferencing, network gaming, social media applications, or any application or setting on the client device 102 that is configured to generate and exchange data with data servers 108 over the MTN 104.

In various embodiments, the QoE optimization system 110 may be configured to monitor and determine whether KPIs for the different data services are being satisfied or not satisfied in association with a particular service level or service goal (e.g., a threshold or model), which may affect the QoE. Examples of KPIs for web browsing, as well as other applications executing on the client device 102, may include webpage loading time, Domain Name System (DNS) lookup time, Transmission Control Protocol (TCP) connect time, TCP round trip time (RTT), Hypertext Transfer Protocol (HTTP) response time, and so forth. Examples of KPIs for video streaming and video conferencing, as well as other applications executing on the client device 102, may include application start delays, catalog browsing, searching delay, video start delay, fast forward and rewind delay, a number of buffering events, duration per buffering event, rebuffering ratio, a video frame rate, and so forth. Other KPIs for a UE may include application layer KPIs (such as average/minimum/maximum bit rate, traffic burstiness, amount of data bytes transferred), transport layer KPIs (such as transmission control protocol (TCP) retransmissions and TCP resets), radio layer KPIs (such as radio link control (RLC) retransmissions and RLC round trip time (RTT)), and physical layer KPIs (such as physical retransmissions, physical RTT, physical uplink (UL) interference, UE power, RACH time). The KPIs provided above are presented as examples, and thus, the list is not exhaustive. Rather, service providers and/or network providers may contemplate a large number of different KPIs which aid in gauging the QoE associated with the data services provided.

FIG. 1B depicts an example of part of an architecture 150 of a QoE optimization system 110, in accordance with embodiments of the disclosure. As illustrated, a QoE analyzer 152 of the architecture 150 may receive trace file(s) 154(1), 154(2) ... 154(J). The QoE analyzer 152 may determinate performance metrics associated with KPIs 156 for data from all or a subset of the trace file(s) 154(1), 154(2) ... 154(J). The QoE analyzer 152 may also correlate the data from the trace file(s) 154(1), 154(2) ... 154(J) and analyze the correlated data based on performance thresholds or performance models 158 to determine whether communication represented by the trace file(s) 154(1), 154(2) ... 154(J) exhibits a degraded QoE. The performance metrics or correlated data produced by the QoE analyzer 152 may then be used to generate one or more graphic representations 160 and/or one or more textual representations 162. Alternatively or additionally, an alert 164 may be provided when the QoE analyzer 152 determines that the communication represented by the trace file(s) 154(1), 154(2) ... 154(J) exhibits a degraded QoE.

In various embodiments, the trace file(s) 154(1), 154(2) ... 154(J) may be trace files from a single node (e.g., trace files 112, 114, or 116) or may be trace files from multiple nodes (e.g., multiple ones of trace files 112, 114, or 116). Each trace file 154 may include data from a single layer of a communication protocol stack (e.g., communication protocol stack 222) of a device (e.g., one of the client device 102, MTN node 106, or data server 108) or from multiple layers of such a device. For example, trace files 154 may include transmission control protocol (TCP) logs, packet capture (PCAP) logs, Qualcomm eXtensible Diagnostic Module (QXDM) logs, application logs (e.g., Log Cat logs), etc. The data included in the trace file 154 may be associated with any sort of communication such as a wireless communication, a wireless packet-based communication, etc. Examples of such communications are described further herein.

Figure 4:
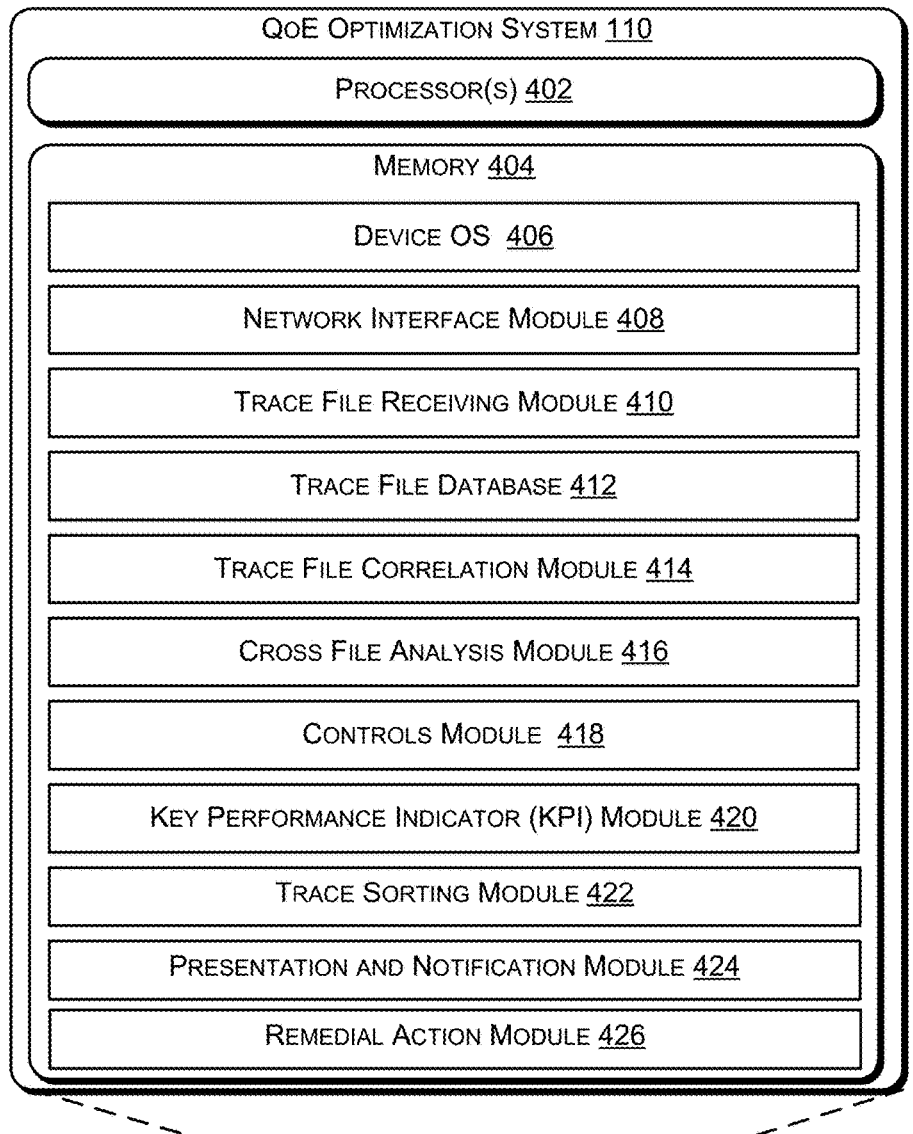
FIG. 4 depicts example components of a device configured to collect and correlate the trace files, as well as perform network analysis, in accordance with embodiments of the disclosure.

Data may be extracted from the trace files by an automated log parser tool, which may be associated, for example, with a trace file receiving module 410 (as further discussed herein with respect to FIG. 4). The trace files 154 and/or the data extracted may then be stored in a trace file database 412 (as further discussed herein with respect to FIG. 4) of the QoE optimization system 110. In some embodiments, the trace file receiving module 410 or another module of the QoE optimization system 110 may then provide the data extracted from the trace files 154 and/or the trace files 154 themselves to the QoE analyzer 152.

The QoE analyzer 152 may be implemented by one or more modules of the QoE optimization system 110, such as the trace file correlation module 414, the cross file analysis module 416, and the trace sorting module 422. In some embodiments, the QoE analyzer 152 may retrieve data associated with a single layer (e.g., the radio layer) which was included in the trace file 154 of a single device. Such data may be retrieved, for instance, from a trace file database 412 or may be provided to the QoE analyzer 152 by the trace file receiving module 410.

The QoE analyzer 152 may then determine performance metrics associated with KPIs for the received/retrieved data. When the received/retrieved data is associated with the radio layer, the QoE analyzer 152 may determine performance metrics associated with radio layer KPIs, such as RLC retransmissions, packet loss, network signaling, radio resource control (RRC) state duration, radio state transition times, times spent in different radio states, number of radio state transitions, or reconfiguration response times. When the received/retrieved data is associated with a network, transport, or Internet layer, the QoE analyzer 152 may determine performance metrics associated with KPIs such as domain name service (DNS) RTT, TCP RTT, hypertext transfer protocol (HTTP) RTT, TCP retransmissions, TCP duplicate acknowledgements, TCP resets, TCP failures, delta frames, or sequence numbers. The QoE analyzer 152 may then provide the determined performance metrics and indication of their associated KPIs to another module of the QoE optimization system 110, such as the presentation and notification module 424. That other module may then generate one or both of a graphic representation 160 for some or all of the performance metrics or a textual representation 162 for some or all of the performance metrics.

Figure 12:
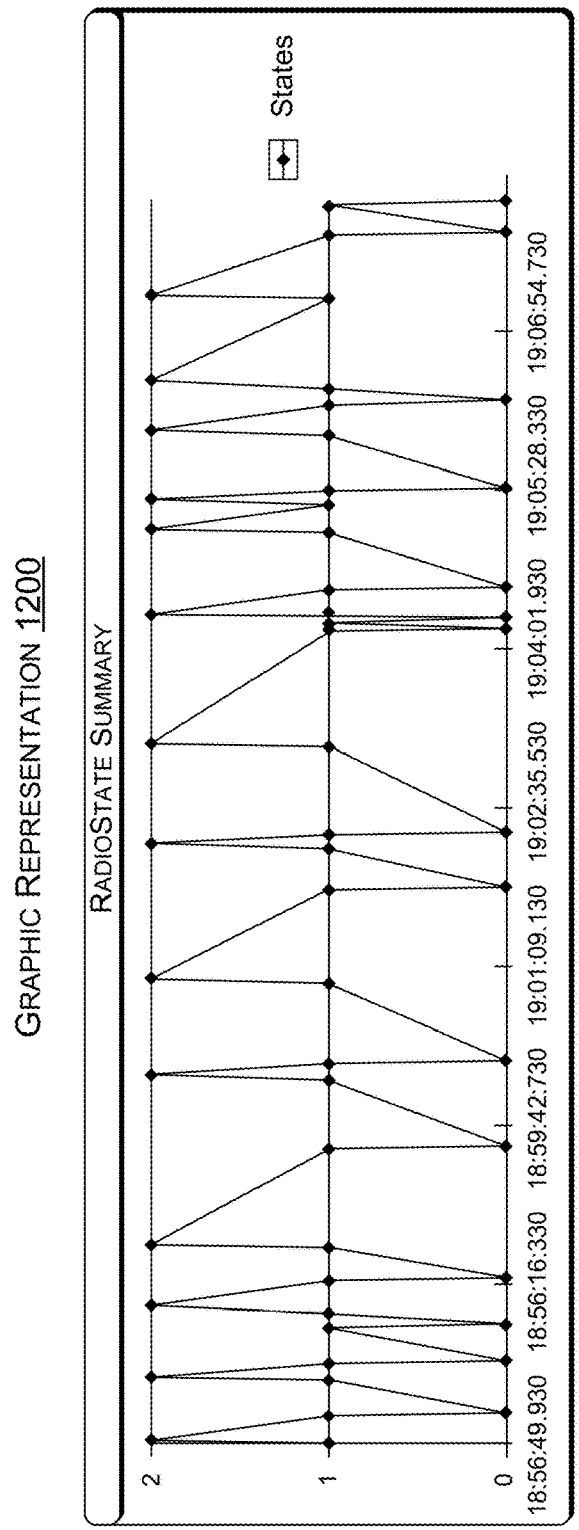
FIG. 12 is an example of a graphic representation of performance metrics associated with communication engaged in by a device.
Figure 13:
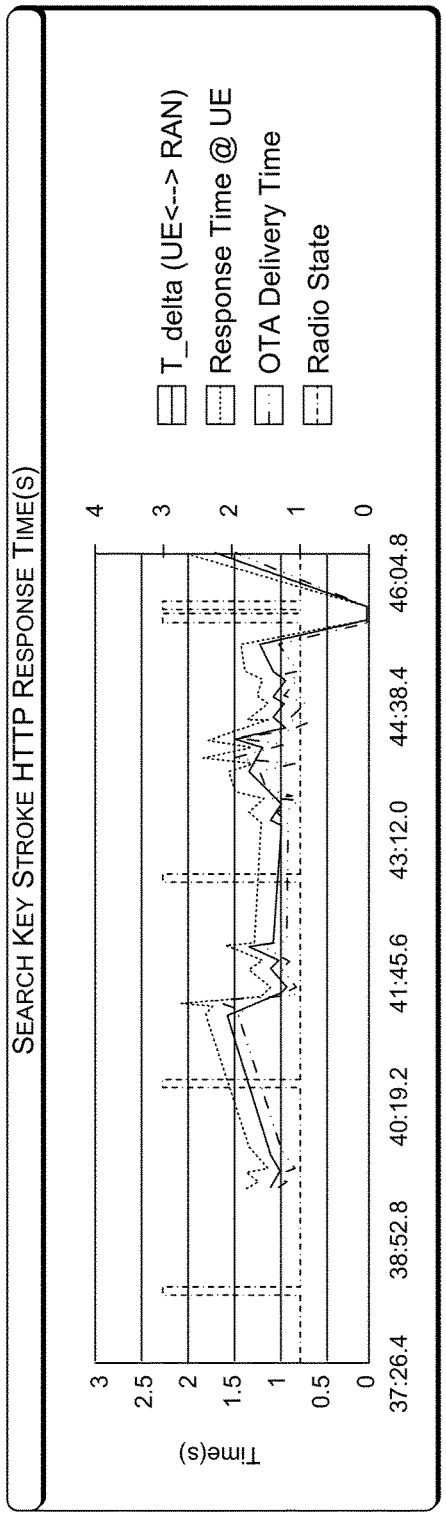
FIG. 13 is an example of a graphic representation of performance metrics associated with communication engaged in by a device.
Figure 14:
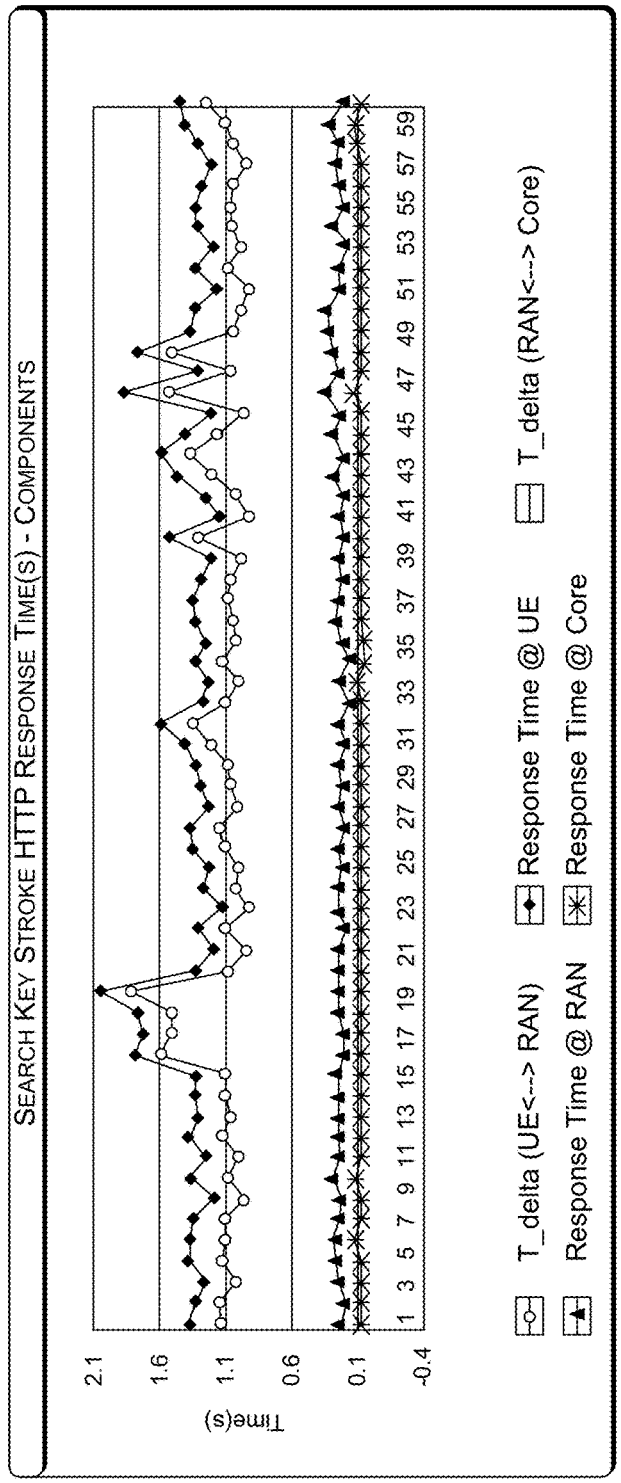
FIG. 14 is an example of a graphic representation of performance metrics associated with communication engaged in by a device.
Figure 15:
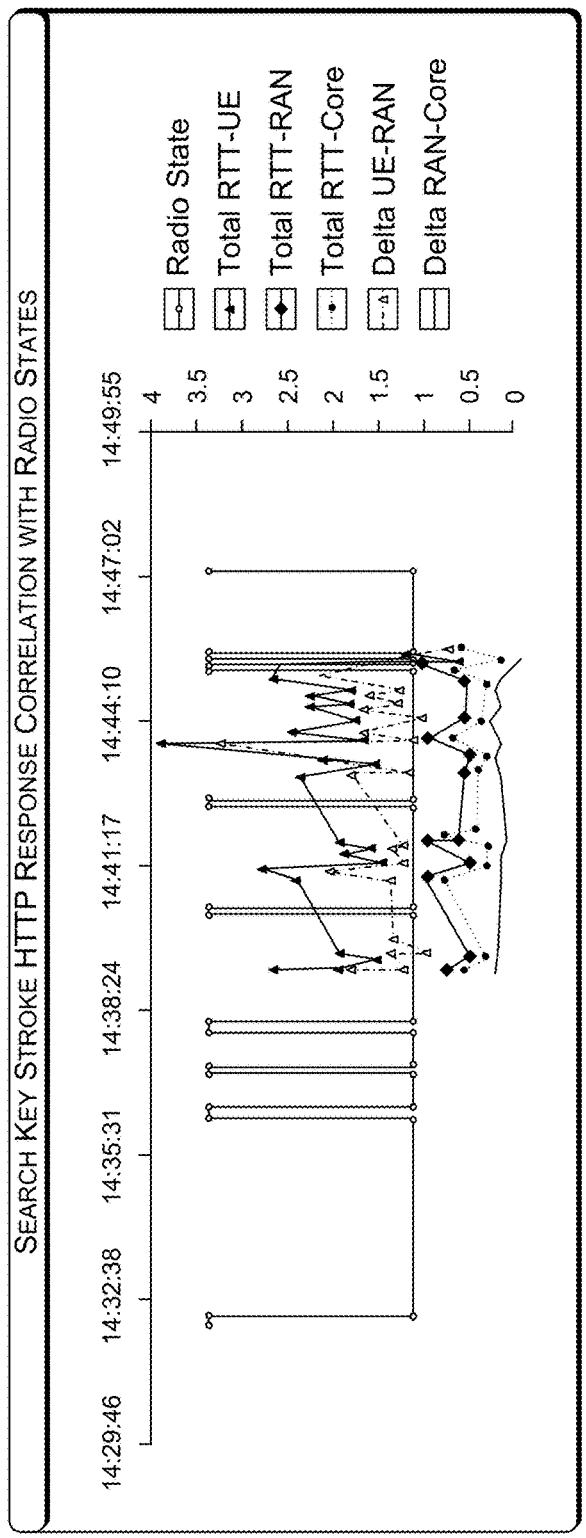
FIG. 15 is an example of a graphic representation of performance metrics associated with communication engaged in by a device.
Figure 16:
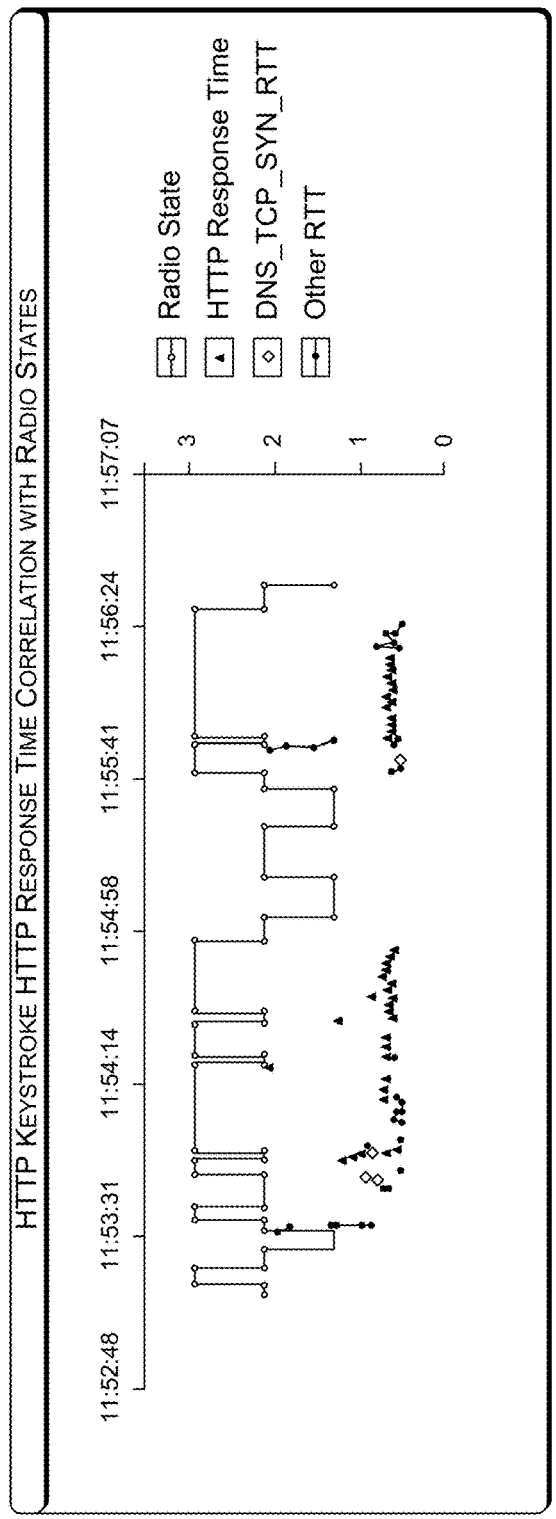
FIG. 16 is an example of a graphic representation of performance metrics associated with communication engaged in by a device.

FIGS. 12-16 are examples of graphic representations 160 of the performance metrics determined by the QoE analyzer 152. In FIG. 12, the graphic representation 1200 is a radio state summary diagram. In FIG. 13, the graphic representation 1300 is a graph of search keystroke HTTP response time(s). In FIG. 14, the graphic representation 1400 is a graph of components of search keystroke HTTP response time(s). In FIG. 15, the graphic representation 1500 is a graph of the correlation of search keystroke response times with radio states. In FIG. 16, the graphic representation 1600 is a graph of the correlation of HTTP keystroke HTTP response times with radio states. Any number of other types of charts and diagrams for performance metrics or correlated data associated with KPIs 156 may also or instead be generated.

FIG. 17 is an example of a textual representation 162 of performance metrics determined by the QoE analyzer 152. In FIG. 17, the textual representation 1700 is a radio state transition log. Any number of other textual or log representations for performance metrics or correlated data associated with KPIs 156 may also or instead be generated.

Returning to FIG. 1B, the QoE analyzer 152 may also or instead retrieve data associated with multiple layers (e.g., the radio layer and the network layer) which was included in one or more trace files 154 of a single device. Such data may be retrieved, for instance, from a trace file database 412 or may be provided to the QoE analyzer 152 by the trace file receiving module 410. The QoE analyzer 152 may then correlate received/retrieved data from different ones of the layers with each other. The data being correlated may, for instance, represent a data packet. The QoE analyzer 152 may correlate data from a first layer which represents the data packet with data from a second layer which represents the data packet. In some embodiments, the QoE analyzer 152 may correlate the data based on the representations of the IP payload of the data packet in the first and second layers. As mentioned above, the correlation by the QoE analyzer 152 may be implemented by a module of the QoE optimization system 110, such as the trace file correlation module 414. Correlation between layers is described below in further detail with reference to FIG. 6.

In some embodiments, the QoE analyzer 152 may also or instead retrieve data from multiple trace files 154 of multiple devices. Such data may be retrieved, for instance, from a trace file database 412 or may be provided to the QoE analyzer 152 by the trace file receiving module 410. The QoE analyzer 152 may then correlate the data. The data may be correlated based on trace identifications (trace ID). Each device may use the same trace ID for the same data packet, request/response pair, or communication session. The correlation between trace files 154 of multiple devices by the QoE analyzer 152 may be implemented by a module of the QoE optimization system 110, such as the trace file correlation module 414. This correlation is described further herein in greater detail.

In various embodiments, the QoE analyzer 152 may then analyze the correlated data based on either or both of performance threshold or models 158. The performance thresholds or models 158 may be static or learned. For example, the performance threshold or models 158 may represent the typical communication of a data packet, a request/response, or a session. When the correlated data does not match or is outside of a tolerance threshold from the performance threshold or models 158, the QoE analyzer 152 may determine that the communication represented by the correlated data exhibits a reduced QoE. This analysis of correlated data may be implemented by a module of the QoE optimization system 110, such as the cross file analysis module 416. This analysis is described further herein in greater detail.

When the QoE analyzer 152 determines that the communication represented by the correlated data exhibits a reduced QoE, a module of the QoE optimization system 110 may provide an alert 164 of the reduced QoE. The presentation and notification module 424 may be an example of such a module and may provide alerts of reduced QoE responsive to determination of the reduced QoE by the QoE analyzer 152.

Additionally or alternatively, the module of the QoE optimization system 110, such as the presentation and notification module 424, may generate a graphic representation 160 or textual representation 162 for the correlated data.

FIG. 1C depicts an example environment 170 where the client device 102 may transmit a client device QoE diagnostic file(s) 176 to a QoE analyzer 180, and analysis may be performed by the QoE analyzer 180. In some embodiments, the QoE analyzer 180 may receive trace files 174(1), 174(2) . . . 174(K) and a client device trace file(s) 178 in addition to or instead of the client device QoE diagnostic file(s) 176.

The QoE analyzer 180 may correspond to the QoE analyzer 152 of FIG. 1B, and may be implemented by one or more modules of the QoE optimization system 110. In some embodiments, the QoE analyzer 180 may perform operations in parallel to the QoE analyzer 152 and/or the QoE optimization system 110, while in some embodiments, the QoE analyzer 180 may perform operations instead of the QoE analyzer 152 and/or the QoE optimization system 110.

In some embodiments, the trace file(s) 174(1), 174(2) . . . 174(K) may correspond to the trace files 114 and 116 of FIG. 1A, and trace files 154 of FIG. 1B. In some embodiments, the client device trace file(s) 178 may correspond to the client device trace file(s) 112 of FIG. 1A, and trace files 154 of FIG. 1B.

The client device 102 may include a client device Quality of Experience (QoE) module 172, which may be implemented in hardware, firmware, or software to perform operations to generate, gather, collect, formulate, filter, partition, estimate, log, track, or perform any pre-processing or post-processing to transmit the client device QoE diagnostic file(s) 176 to the QoE analyzer 180. In some embodiments, the client device QoE module 172 may monitor some or all of the operations of the client device and may generate or collect operation logs or reports corresponding to each operation. For example, the client device QoE module 172 may monitor a call state of the client device 102, a user interface state, IP Multimedia Subsystem (IMS) Session Initiation Protocol (SIP) messages, client device 102 handovers, Real-Time Transport Protocol (RTP) statistics, call settings, signal data, radio band data, location data, timestamps, and device data. In some embodiments, the client device QoE module 172 may create the operation logs monitoring the operations of the client device 102, while in some embodiments, the client device QoE module 172 may collect and filter the data to be included in the client device QoE diagnostic file(s) 176. In some embodiments, the client device QoE diagnostic file(s) 176 may contain information generated, gathered, and/or collected on the client device 102 from which KPIs and/or a client device QoE may be determined (either by the client device QoE module 172 or the QoE analyzer 180). In some embodiments, the QoE module 172 monitors messages between applications in the client device 102, for example, by monitoring intents, to determine the operation states of the client device 102. The client device QoE module 172 and the client device QoE diagnostic file(s) 176 are also discussed in connection with FIGS. 18-21.

The QoE analyzer 180 may include a network KPI module 182, a QoE aggregator module 184, and a QoE trending module 186. Further, the QoE analyzer 180 may contain a processor such as processor(s) 402, a memory such as memory 404, a device OS such as device OS 406, and some or all modules 408-426 of FIG. 4 (as further discussed herein with respect to FIG. 4).

The QoE analyzer 180 may receive the client device QoE diagnostic file(s) 176 and may analyze the file(s) 176 to determine the KPIs that may be used to determine that the client device 102 is experiencing a reduced or diminished QoE, or may determine that the client device 102 has previously experienced a reduced or diminished QoE. In some embodiments, the KPIs may be determined by the client device 102 (or by the client device QoE module 172) prior to being transmitted to the QoE analyzer 180. By way of example, a client device voice quality QoE KPI may be predicted based on Real-Time Packet Protocol (RTP) data (such as a RTP loss rate) and SIP Message trace data (such as codec type and sampling rate) (as further discussed herein with respect to FIGS. 18-21). An example of a reduced or diminished QoE may be a dropped call, an increase in the frequency of dropped calls, reduced quality of voice, video, or data communication, and call setup problems such as a delay in connecting, an inability to connect, etc. In some embodiments, the QoE analyzer 180 may determine a reduced or diminished QoE based on the operational states of the client device 102, KPIs and/or QoE measured or determined by the client device 102, or a QoS measured or determined by the client device 102.

As a non-limiting example, QoE KPIs for a voice call may indicate whether a call was dropped or not, whether a call setup failure occurred or not, the presence and amount of any dead air (e.g., unwanted silence caused by data transmission errors) on the voice call, a mean opinion score (MOS Score) (indicating voice call quality on a scale of 0 to 5), provisioning status, registration status, and/or an amount of time required for a call setup. By way of example, a "good" QoE for a voice over LTE (VoLTE) call might be "no call drop," "no call setup failure," "no dead air," "average of 4.3 MOS," "no provisioning issue," "no registration issue," and "4 seconds of call setup time." On the other hand, and by way of example, a "bad" QoE VoLTE call may include indications of "call setup successful" but "9 seconds of call setup time." In this example, the call setup time may be 5 seconds longer than an average call setup time, which may indicate a diminished QoE. Further, the "bad" QoE VoLTE call might include indications of "30 seconds of dead air started 40 seconds into the call," and "call drop occurred after the dead air." Further, an example of a "worse" QoE VoLTE call may include indications of "call dropped as soon as it was attempted (due to provisioning issues)." As may be understood in the context of this disclosure, these examples of QoE for a VoLTE call are illustrative and may include other factors, indications, and/or lengths of time.

The network KPI module 182 may perform operations to determine or estimate KPIs or a QoS of the client device 102. The network KPI module 182 may determine a network-based KPI of the client device 102 based on the data or parameters available to the QoE analyzer 180, such as the client device trace file(s) 178 and/or trace files 174. In some embodiments, the network KPI module 182 may determine a network-based KPI of the client device 102 based in part on a QoS for the client device 102, or based in part on KPIs determined from the client device trace file(s) 178 and/or trace file(s) 174.

The QoE aggregator module 184 may aggregate client device KPIs or client device QoE determined from the client device QoE diagnostic file(s) 176 and/or the network KPI module 182, or received from the client device 102 (e.g., as determined by the client device QoE module 172). In some embodiments, the QoE aggregator module 184 may aggregate KPIs using the client device QoE diagnostic file(s) 176, while in some embodiments, the QoE aggregator module 184 may aggregate network and device QoE KPIs, while in some embodiments device QoE KPIs may be aggregated for multiple client devices over multiple communications (e.g., voice calls).

The QoE trending module 186 may determine QoE trends for an individual client device 102, or may determine QoE trends for a plurality of client devices and/or nodes connected to the MTN 104. In some embodiments, the QoE trending module 186 may aggregate client device QoE diagnostic file(s) 176 over time for a single client device 102, while in other embodiments, the QoE trending module 186 may aggregate QoE diagnostic files for a plurality of devices over any period of time. In some embodiments, the QoE aggregator module 184 may aggregate client device KPIs and/or QoE determined by the QoE analyzer 180 or the client device 102. In some embodiments, the QoE trending module 186 may generate graphical and/or textual representations of trending data, and/or may generate alerts indicating that a trend has been detected or may be remediated. The QoE analyzer 180, the network KPI module 182, the QoE aggregator module 184, and the QoE trending module 186 are also discussed in connection with FIGS. 18-21.

Figure 22:
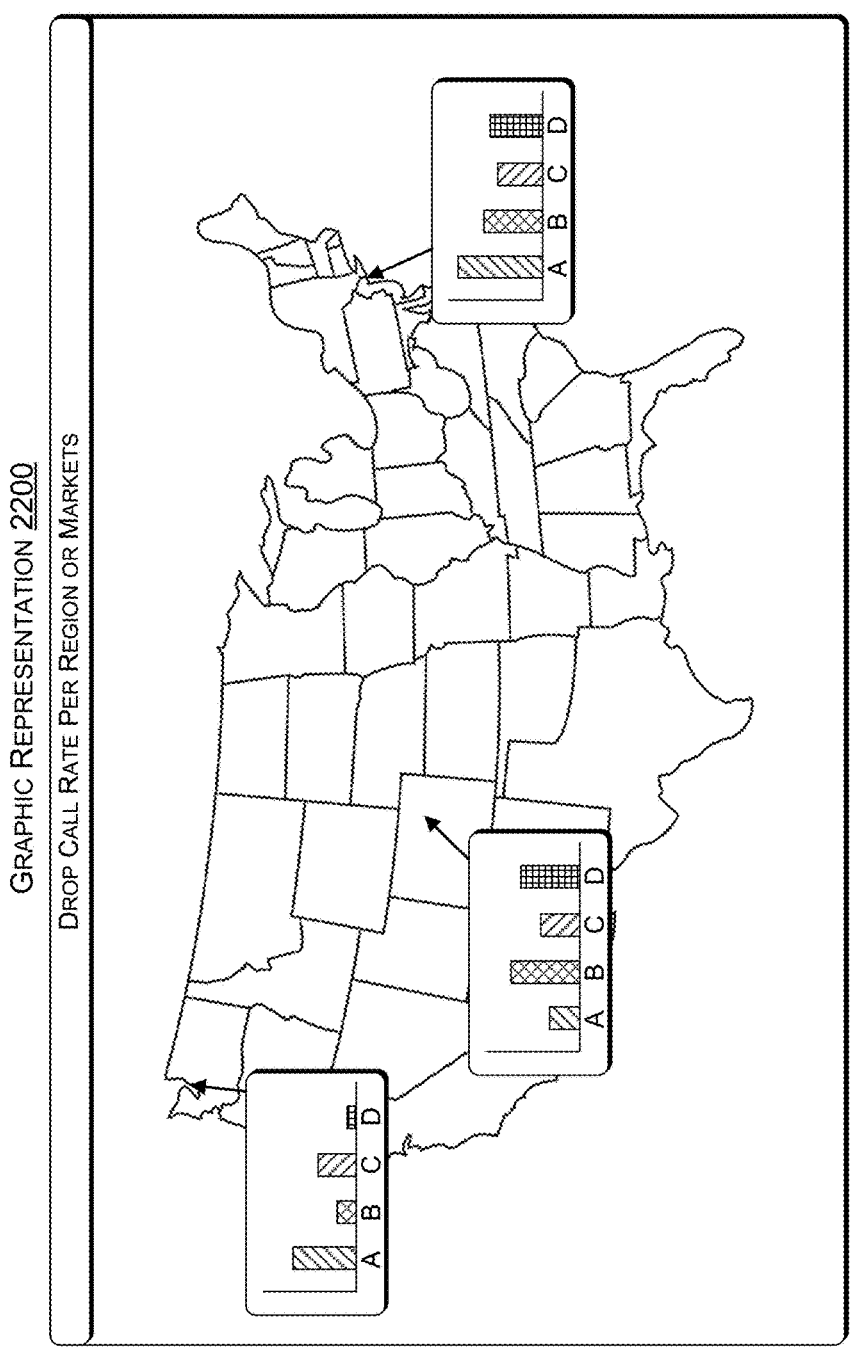
FIG. 22 is an example of a graphic representation of aggregated device QoE metrics, in accordance with embodiments of the disclosure.
Figure 23:
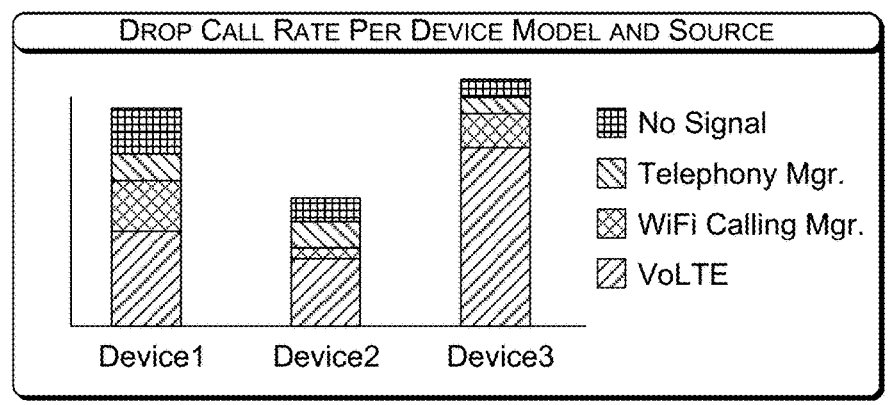
FIG. 23 is an example of a graphic representation of aggregated device QoE metrics, in accordance with embodiments of the disclosure.
Figure 24:
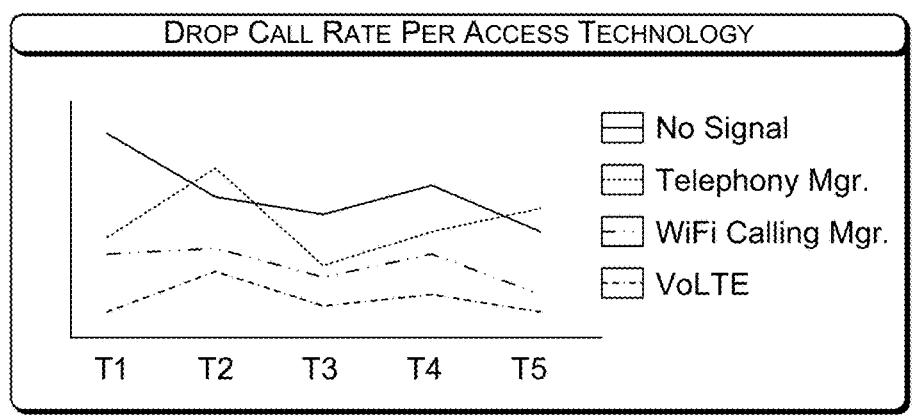
FIG. 24 is an example of a graphic representation of aggregated device QoE metrics, in accordance with embodiments of the disclosure.

FIGS. 22-24 are examples of graphic representations of aggregated device KPI and/or QoE metrics illustrating trends, in accordance with embodiments of the disclosure. In some embodiments, the graphic representations 2200, 2300, and 2400 may be determined by the QoE analyzer 180 for an individual client device 102, or may be determined by the QoE analyzer 180 and/or the QoE trending module 186 for aggregated data representing a plurality of devices over a period of time. In FIG. 22, the graphic representation 2200 is an analysis of drop call rates per regions or markets. In FIG. 23, the graphic representation 2300 is a graph of drop call rates indexed according to device model and a source of a call drop. In FIG. 24, the graphic representation 2400 is a graph of a drop call rate indexed by access technology over a period of time T1, T2, T3, T4, and T5. Any number of other charts and diagrams for client device KPIs and/or QoEs may also or instead be generated.

Figure 2:
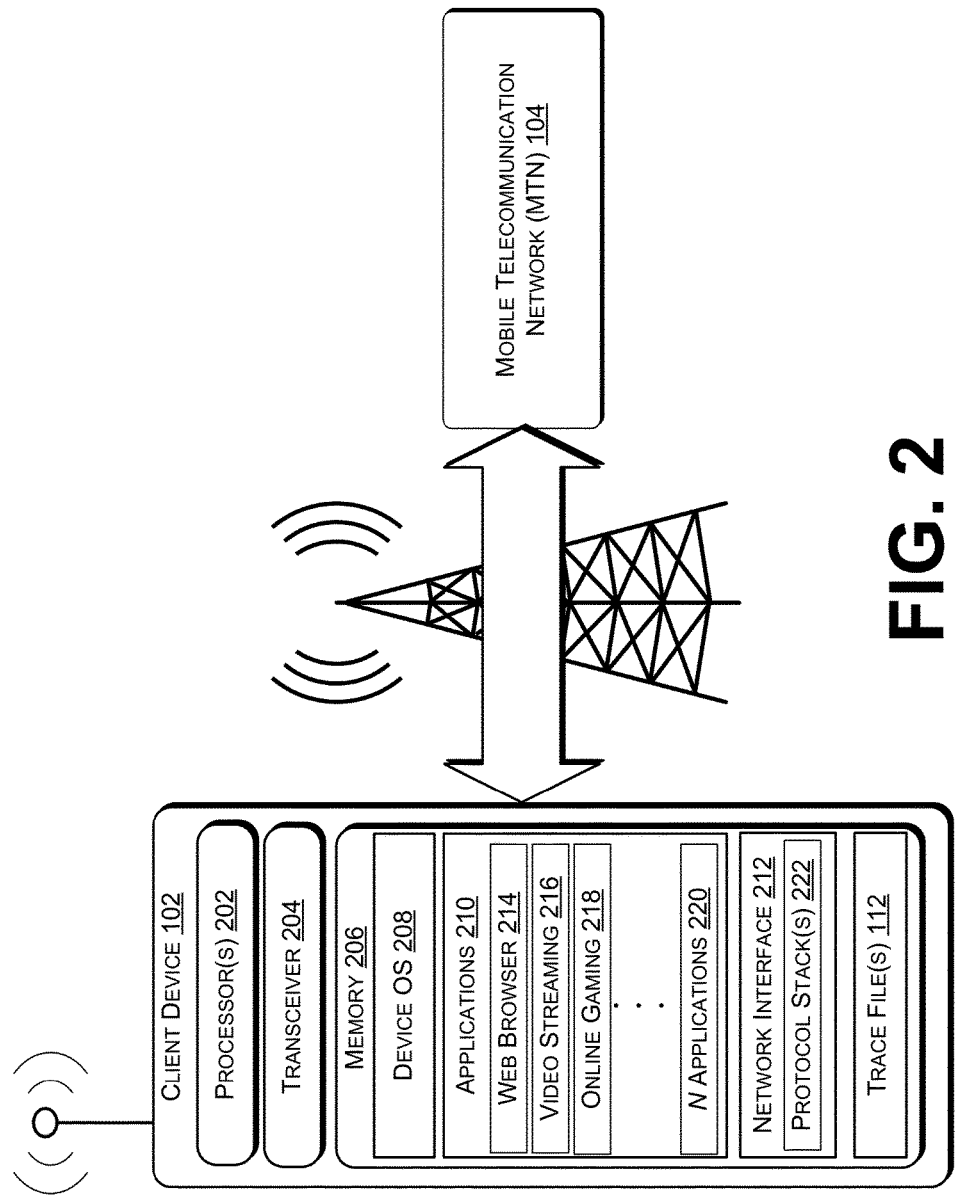
FIG. 2 depicts example components of a client device configured to initiate data communications and log trace file entries in a trace file, in accordance with embodiments of the disclosure.

FIG. 2 illustrates example components of the client device 102, which is configured to wirelessly transmit a request for data to the MTN 104 or receive data from the data servers 108 over the MTN 104. Thus, the client device 102 may include one or more processor(s) 202, a radio transceiver 204 for wirelessly communicating with the MTN 104, and a memory 206 storing a device operating system (OS) 208, various software applications 210 configured to request/receive data over the MTN 104, a network interface module 212, and the client device node trace files 112.

In various embodiments, the applications 210 stored at the client device 102 may include, but are not limited, a web browser application 214, a video streaming application 216, an online gaming application 218, and so on, through an Nth software application 220. During execution on the client device 102, each of the applications 210 may be configured to cause the client device 102 to initiate data communications with the data servers 108 over the MTN 104.

The client device 102 may be configured to communicate over a telecommunications network using any common wireless and/or wired network access technology. Moreover, the client device 102 may be configured to run any compatible device OS, including but not limited to, Microsoft Windows Mobile®, Google Android®, Apple iOS®, Linux Mobile®, as well as any other common mobile device OS.

Each of the one or more processor(s) 202 can include one or more central processing units (CPUs) having multiple arithmetic logic units (ALUs) that perform arithmetic and logical operations, as well as one or more control units (CUs) that extract instructions and stored content from processor cache-level memory, and then executes instructions by calling on the ALUs during program execution. In an implementation, the processor(s) 202 may be configured to execute each of the software applications 210 stored in the memory 206. In various embodiments, the network interface module 212 may be configured to detect an action (e.g., operation, command, user input) directed to one of the applications 210, the action triggering the generation of a data transfer request and a transmission of the data transfer request.

The memory 206 may be implemented using computer readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism.

In various embodiments, the memory 206 may store a client device QoE module 172, as illustrated in FIG. 1C.

In various embodiments, the client device node trace files 112 may correspond to individual ones of multiple layers of a communication protocol stack 222 associated with the network interface module 212 of the client device 102. For example, the multiple layers of the communication protocol stack 222 may correspond to the Open Systems Interconnection (OSI) model characterizing and standardizing functions of a communications system in terms of abstraction layers. The multiple layers may also correspond to the Internet Protocol (IP) suite. For example, in various embodiments, the client device 102 may log a single client device node trace file 112 for each of a physical layer, a data link/radio layer, a network layer/Internet layer, a transport layer, a session layer, a presentation layer, and an application layer, as a data packet is generated and configured amongst the layers for communication from the client device 102 to the data servers 108 over the MTN 104.

Moreover, the client device 102 may log a single client device node trace file 112 for a particular set of the layers of the communication protocol stack 212. For example, the client device 102 may log a first client device node trace file 112 for the application/presentation/session layers, a second client device node trace file 112 for the transport/network layers, a third client device node trace file 112 for the data link layer, and a fourth client device node trace file 112 for the physical layer. By logging trace files at the layer level of the client device 102, the QoE optimization system 110 may be able to determine the root cause of problems at a more granular level after collecting the trace files at the layer level (as compared to the node level). This may further help when identifying remedial actions that optimize the QoE.

Similar to the multiple different layers at the client device 102, each of the MTN nodes 106(1) . . . 106(N), as well as each of the data servers 108, may also log different trace files (e.g., 114(1) . . . 114(N) and 116) for individual layers, or defined combination(s) of layers of the communication protocol stack of that MTN node 106/data server 108. Accordingly, the QoE optimization system 110 may also identify the root cause of problems at a more granular level at the MTN nodes 106(1) . . . 106(N) and the data servers 108.

FIG. 3A depicts an example data packet 300 configured to be logged in one of the client device node trace files 112, the MTN node trace files 114(1) . . . 114(N), or the data server node trace files 116. The data packet 300 may be configured in association with one or more communication or data exchange/formatting protocols such as TCP, IP, HTTP or other protocols directed to communicating or exchanging content over the MTN 104.

In various embodiments, the data packet 300 may include a header portion 302 and a payload portion 304. The data packet may further include a portion including N fields, at least a portion of which are used to create a trace ID 306 for the data packet. In various embodiments, the fields used to create the trace ID 306 may be part of the header portion 302, the payload portion 304, or a combination thereof.

In various embodiments, one or more of the N fields may be associated with routing and addressing information commonly included in the data packet, or one or more fields that may be defined and are unique to a particular protocol. For example, a field may include a Packet Data Protocol (PDP) address, a source port number, a destination port number, a checksum number (for IPv4 or IPv6), a sequence number, an acknowledgement number, an Internet Protocol (IP) address, a source address, a destination address or any other field in the data packet that may help distinguish one data packet from another. Moreover, a field may also help identify a request/response sequence or pair, or a particular communication session established, such that data packets can be matched and/or correlated correctly, even though the trace ID 306 as a whole may not be an exact match.

Accordingly, the trace ID 306 may be comprised of a single field, or a combination of two fields, three fields, four fields, and so forth. The more fields used to comprise the trace ID 306 may help ensure that the trace ID 306 is unique for the data packet or correlates related data packets, so that the data packets can be tracked through their communication paths. In at least one embodiment, the trace ID 306 includes four fields: a PDP address, a checksum number, a source port number, and a destination port number.

FIG. 3B depicts an example trace file 308 that may correspond to the client device node trace files 112 logged at the client device, the MTN node trace files 114(1) . . . 114(N) logged at the MTN nodes 106(1) . . . 106(N), or the data server node trace files 116 logged at the data servers 108. The trace file 308 may include a node identifier 310 that the QoE optimization system 110 may use so that it knows what node (e.g., the client device 102, one of the MTN nodes 106(1) . . . 106(N), or a data server 108) the trace file is associated with after the QoE optimization system 110 collects the trace files. Thus, the QoE optimization system 110 will be able to identify the node or nodes where the root cause of the problems is occurring and then implement remedial actions accordingly.

In various embodiments, the trace file 308 is configured to log entries for the data packets communicated via a node or node interface, e.g., the traces column 312 (e.g., the trace IDs 306 in the traces column 312 may correspond to multiple different client devices using the node to communicate). Moreover, the trace file 308 is configured to receive timing information 314 in the form of a timestamp for each entry, and associate/store the timestamp with the entry, as shown. Accordingly, the trace file 308 may sequentially log a list of numerous data packet IDs and timestamps associated with when the data packets were received, transmitted, routed, and so forth.

At each node, the timestamps are logged via use of a time source (e.g., a local time source or a remote time source). In one embodiment, the time source may be common for the nodes, or at least some of the nodes. In an alternative, the time source may be different for each node, or at least some of the nodes. Thus, the timing information 314 merged together (from multiple trace files) may be approximated merged timing information because some nodes may use different time sources that may not be synchronized.

FIG. 4 illustrates example components of the QoE optimization system 110. In various embodiments, the QoE optimization system 110 may be a service provider entity or a telecommunications provider entity that may be part of one of the MTN nodes 106(1) . . . 106(N), or in communication with the MTN nodes 106(1) . . . 106(N) via a network connection. Moreover, in various embodiments, the QoE optimization system 110 may be a standalone application that is part of the client device 102 or a data server 108.

In various embodiments, the QoE optimization system 110 may be one or more server or computing devices that include one or more processor(s) 402 and memory 404 storing a device OS 406 and a network interface module 408 that enables the trace file receiving module 410 of the QoE optimization system 110 to communicate and receive the trace files from the nodes in FIG. 1A, and store the trace files or data retrieved from the trace files in the trace file database 412.

Each of the one or more processor(s) 402 of the QoE optimization system 110 may include one or more CPUs having multiple ALUs that perform arithmetic and logical operations, as well as one or more CUs that extract instructions and content from processor cache memory, and then executes the instructions by calling on the ALUs, as necessary, during program execution. The processor(s) 402 may further be configured to execute the modules stored in the memory 404.

The memory 404 may be implemented using computer readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism.

In various embodiments, the memory 404 may further store a trace file correlation module 414, a cross file analysis module 416, a controls module 418, a key performance indicator (KPI) module 420, a trace sorting module 422, a presentation and notification module 424, and a remedial action module 426.

In various embodiments, the memory 404 may further store a network KPI module 182, a QoE aggregator module 184, and a QoE trending module 186, as illustrated in FIG. 1C.

The trace file correlation module 414, described above with respect to the QoE analyzer 152, is configured to merge and/or otherwise correlate the client device node trace files 112, the MTN node trace files 114(1) . . . 114(N), and/or the data server node trace files 116. By merging and/or correlating the trace files, the trace file correlation module 414 matches trace IDs 306 from different nodes that may be associated with the same data packet. Accordingly, the trace ID 306 remains constant as the data packet is communicated and/or routed from the client device 102 to the one or more data servers 108 (e.g., uplink via a determined route/path in the MTN 104), or from the one or more data servers 108 to the client device 102 (e.g., downlink via a determined route/path in the MTN 104). In at least some embodiments, the trace file correlation module 414 may merge or otherwise correlate a subset of a total number of trace files collected.

In some embodiments, the trace file correlation module 414 is further configured to match corresponding request/response data packets that may not have the same trace ID 306, but may be paired by referencing one or more fields in the trace ID 306 that associates a response packet with a request packet (e.g., a sequential indicator conveying that response packet "2" is responsive to request packet "1"). In further embodiments, the trace file correlation module 414 may match a group of data packets communicated within an established communication session (e.g., a video stream), by referencing one or more fields in the trace ID 306 that associate the data packet with the communication session. One or more fields used by the trace file correlation module 414 to match a request packet and a response packet, or to match data packets communicated within an established communication session, may depend on a type of communication protocol used.

In various embodiments, once the trace file correlation module 414 merges or otherwise correlates the trace files and matches trace IDs 306 for a single data packet, for a request/response packet pair, or for data packets communicated within an established communication session, then the cross file analysis module 416 may use the correlation to perform network communications analysis and to determine the root cause of problems which may be leading to a degradation in QoE. In various embodiments, the cross file analysis module 416 may use the timing information 314 for the matched trace IDs 306 to perform the network communications analysis and to determine the root causes of problems that can be identified via timing issues. Example network communications analysis may relate to: packet delay, latency mapping, packet drop rate, congestion windows, packet loss, packet error rate, location of retransmission requests and a number of retransmission requests, etc. Moreover, results from the network communication analysis may identify one or more nodes along the communication path that are the root cause of the problems, and why the one or more nodes are the root cause of the problems. Therefore, the QoE optimization system 110 can identify opportunities to optimize the QoE by eliminating the problems, or part of the problems, via remedial actions.

In various embodiments, the cross file analysis module 416 may perform analysis across the multiple correlated trace files in accordance with instructions received from a controls module 418. The controls module 418 may receive a specific type of analysis to be performed from a network administrator. For example, the network administrator may input commands to the controls module 418 that identify one or more KPIs to be analyzed to ensure that a defined service level or service goal is or is not being satisfied. In various embodiments, the KPI module 420 defines the different KPIs, as listed above, for different applications 210 executing on the client device 102. Moreover, the KPI module 420 may also define particular service levels or service goals for the KPIs (such as, e.g., the performance thresholds or models 158), as defined by a service provider or a network telecommunications provider (e.g., by a network administrator acting as an agent for the service provider or the network telecommunications provider).

In some embodiments, the cross file analysis module 416 may perform analysis automatically. Thus, a network administrator may configure the trace file receiving module 410 of the QoE optimization system 110 to collect the different trace files so that they can be merged or otherwise correlated by the trace file correlation module 414 and the cross file analysis module 416 can perform some sort of analysis in a periodic manner (every hour, every day, every two days, and so forth). In various embodiments, this automatic analysis may be performed separately for individual KPIs or a particular combination of KPIs. In other embodiments, the automatic and periodic analysis may be performed for a particular application of the various applications 210 configured to be executed on the client device 102.

In various embodiments, the trace sorting module 422 may be employed by the cross file analysis module 416 to sort the trace IDs 306 that have been merged or otherwise correlated from the trace files collected. This sorting, or filtering, may aid in the analysis performed by the cross file analysis module 416. For example, the trace sorting module 422 may use one or more of the fields to sort the trace IDs so that data packets sent from or sent to a particular client device 102 are identified (e.g., a particular user or subscriber). The trace sorting module 422 may use the timestamps to sort the trace IDs 306 so that data packets in a particular timing window are identified. The trace sorting module 422 may use the trace sorting module 422 may use one or more of the fields to sort the trace IDs 306 so that data packets from a particular type of equipment (e.g., a model from a manufacturer) are identified. The trace sorting module 422 may use one or more of the fields to sort the trace IDs 306 so that data packets communicated for a particular application are identified. The trace sorting module 422 may use one or more of the fields to sort the trace IDs 306 so that data packets communicated to/from a particular source are identified (e.g., a data server 108).

In various embodiments, the QoE optimization system 110 employs the presentation and notification module 424 to format and present a notification or alert (e.g., via a graphical user interface), such as the alert 164, after the cross file analysis module 416 performs a network performance analysis. In one embodiment, a notification may state that networks communications are well and that one or more KPIs and service levels are being satisfied. Therefore, QoE is not currently degraded. In an alternative embodiment, an alert may report that network communications are causing degradation in QoE because one or more KPIs and a particular service level are not being satisfied. In this alternative embodiment, the presentation and notification module 424 may convey a location (e.g., one or more nodes) of the root cause of the problems and/or one or more reasons for the problems.

In some embodiments, the presentation and notification module 424 may also be configured to generate graphic representations 160 or textual representations 162, as is described in greater detail herein. Also, the presentation and notification module 424 may enable a user of the QoE optimization system 110 to initiate a test communication of data packets from one of the client device 102, MTN node 106, or data server 108 to another of the client device 102, MTN node 106, or data server 108. Data associated with that test communication will then be represented in some or all of the trace files 112-116 and available for collection and analysis.

In various embodiments, the remedial action module 426 may include instructions to remediate the network communication problems identified. Thus, the cross file analysis module and/or the presentation and notification module 424 may access the remedial action module to determine one or more suggested solutions to the problems, and then present the selected solutions via a graphical user interface so they may be implemented. In at least one embodiment, the remedial action module 426 is configured to implement the solutions automatically in response to the identification of the problems.

Figure 5:
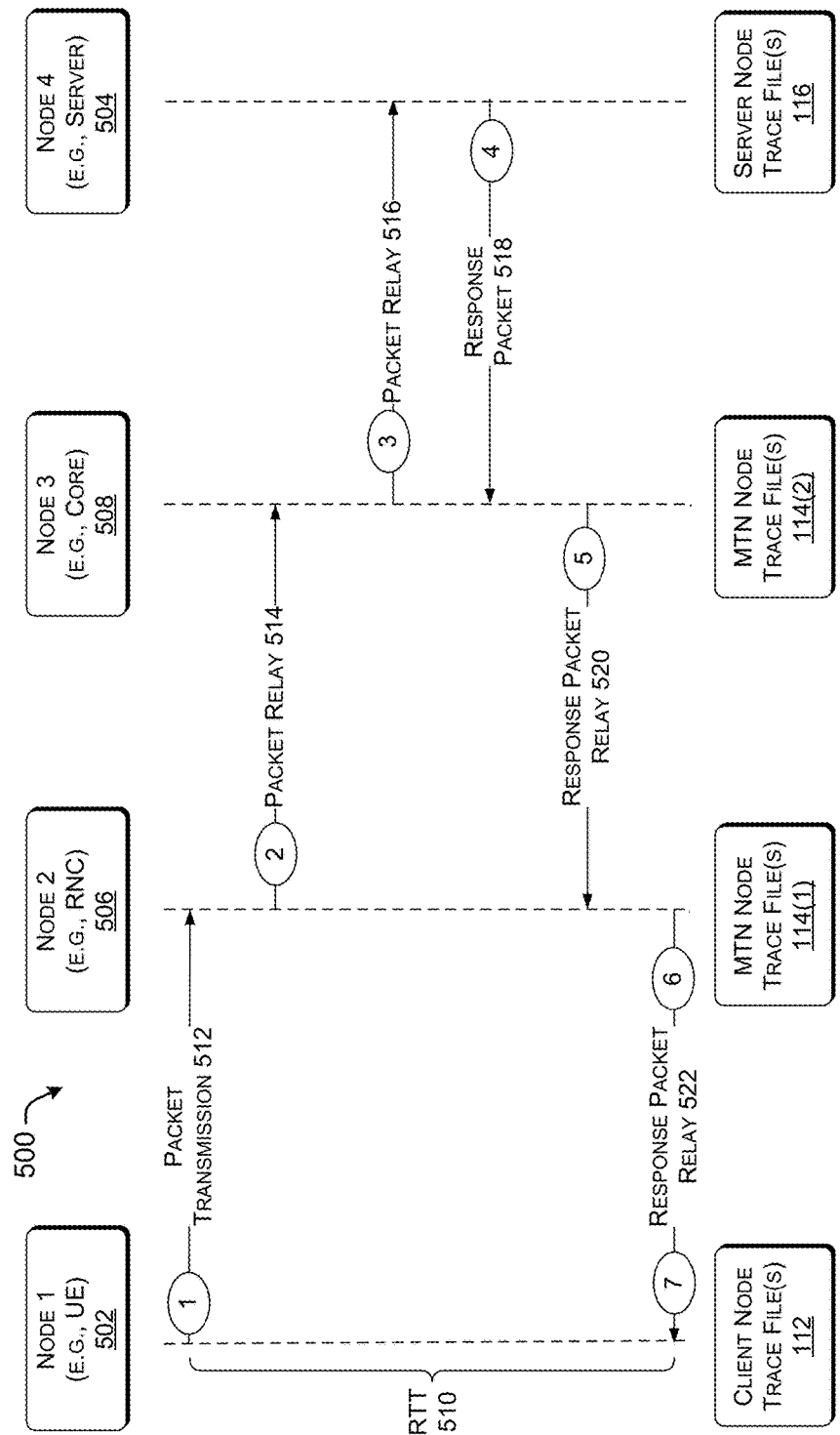
FIG. 5 is an example data packet communication diagram that is transmitted over a network and that represents horizontal correlation, in accordance with embodiments of the disclosure.

FIG. 5 illustrates an example timing diagram 500 of data packets being exchanged between a first node 502 (e.g., the client device 102 or UE) and a fourth node 504 (e.g., a data server 108), via a second node 506 (e.g., an RNC) and third node 508 (e.g., a core network node) that may be part of the MTN 104. This example is provided to show how the QoE optimization system 110 may identify network communication problems using the timing information 314 in the trace files 308. Accordingly, the first node 502 logs trace entries in the client node trace files 112, the second node 506 logs trace entries in MTN node trace files 114(1), the third node 508 logs trace entries in MTN node trace files 114(2), and the fourth node logs trace entries in server node trace files 116. While four nodes are depicted in FIG. 5, it is understood in the context of this document that additional nodes may be involved in the exchange of data packets between a client device 102 and a data server 108, particularly additional nodes within the MTN 104. The example timing diagram 500 in FIG. 5 represents a horizontal correlation of packets communicated across multiple nodes of a network. Horizontal correlation may use horizontal unique trace IDs based on packet header information to correlate the packets across the multiple nodes. In contrast, vertical correlation refers to packets as they are communicated amongst multiple different layers (e.g., OSI model layers or stacks) at a single node, as further discussed with respect to FIG. 6. Vertical correlation may use a vertical unique trace ID based on IP payloads to correlate the packets as they are communicated through the layers.

FIG. 5 illustrates an initial data packet being sent from the first node 502 to the fourth node 504 (e.g., via an uplink), and a response data packet being sent from the fourth node 504 to the first node 502 (e.g., via a downlink). Accordingly, FIG. 5 shows a RTT 510 at the first node 502 that represents a time between the transmission of the initial data packet and the reception of the response data packet.

As illustrated in FIG. 5, the initial data packet is generated at the first node 502 and transmitted 512 to the second node 506. Thus, the first node 502 may log an entry for the data packet in the client node trace files 112 with a timestamp (e.g., labeled "1" in FIG. 5). The second node 506 receives the initial data packet, may access, change and/or add routing information, and then relays 514 the initial data packet to the third node 508. In association with this functionality, the second node 506 may log an entry with a timestamp for the data packet in the MTN node trace files 114(1) (e.g., labeled "2" in FIG. 5). Similarly, the third node 508 receives the relayed data packet, may access, change and/or add routing information, and then relays 516 the data packet to the fourth node 504. Here, the third node 508 may log an entry with a timestamp for the data packet in the MTN node trace files 114(2) (e.g., labeled "3" in FIG. 5).

Then the fourth node 504 receives the initial data packet and generates and transmits 518 the response packet, logging an entry with a timestamp for the data packet received, and/or the response data packet response transmitted, in the server node trace files 116 (e.g., labeled "4" in FIG. 5). Similar to the uplink, the third node 508 and the second node 506 route and relay the response packet back to the first node 502 at 520 and 522, and log entries with timestamps for the response packet (e.g., labeled "5" and "6"). The first node 502 then logs an entry with a timestamp for the response packet (e.g., labeled "7" in FIG. 5), and the RTT is complete.

When the QoE optimization system 110 collects the trace files associated with the example timing diagram in FIG. 5, the QoE optimization system 110 may determine that the RTT 510 is longer than normal or longer than expected for the particular application being used at the first node 502. After this determination, the QoE optimization system 110 may utilize the merged trace files and the separate timestamps, as discussed above with respect to FIG. 4, to calculate individual packet communication delays between the nodes (whether uplink or downlink), and identify one or more nodes that may contribute most to the longer than expected RTT during the uplink and/or the downlink (e.g., at which node was the data packet delayed).

In various embodiments, the timing diagram 500 of FIG. 5 may be representative of a TCP handshake (e.g., a synchronize request and an acknowledgement response) between a client device 102 and a data server 108. In other embodiments, the timing diagram 500 of FIG. 5 may be representative of a DNS lookup between a client device 102 and a DNS server. In even further embodiments, the timing diagram 500 of FIG. 5 may be representative of an HTTP request and a data packet response between a client device 102 and a data server 108.

Figure 6:
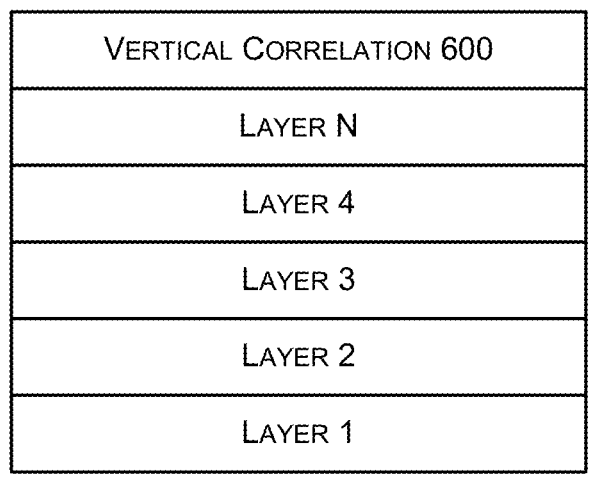
FIG. 6 is an example model that represents vertical correlation, in accordance with embodiments of the disclosure.

FIG. 6 illustrates an example of the vertical correlation 600 that represents packets as they are generated at and/or communicated amongst multiple different layers (e.g., 1 . . . N) of a communication protocol stack, such as communication protocol stack 222, at a single node. For example, the different layers may be associated with an OSI model and thus may be a physical layer, a data link layer, a network layer, a transport layer, a session layer, a presentation layer, and an application layer (as well as sublayers within the layers). Moreover, vertical correlation may use a vertical unique trace ID based on IP payloads to correlate the packets as they are communicated through the layers. Such vertical correlation is described above in greater detail with reference to FIG. 1B.

FIGS. 7-11 present illustrative processes. Each process is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes in FIGS. 7-11 are described with reference to the example environment 100 of FIG. 1A, the example architecture of FIG. 1B, the example components of FIGS. 2 and 4, the example data packet of FIG. 3A, the example trace file of FIG. 3B, the example timing diagram of FIG. 5, and/or the example vertical correlation of FIG. 6.

Figure 7:
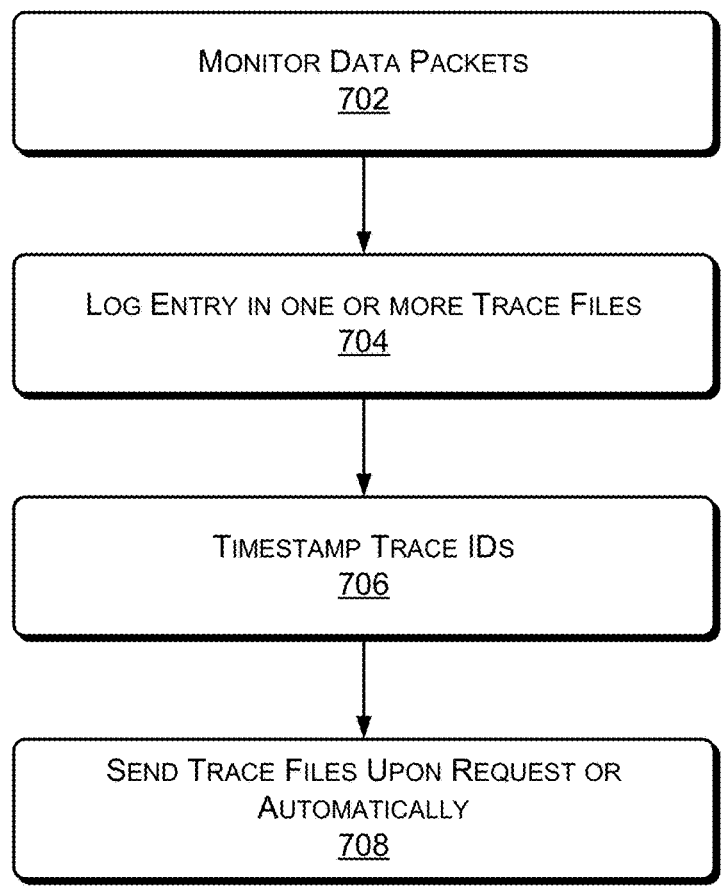
FIG. 7 is a flow chart of an example process for logging trace entries in a trace file, in accordance with embodiments of the disclosure.

FIG. 7 shows a flow chart of an example process 700 for logging entries in a trace file. The example process 700 may be performed at a node that generates, communicates, receives, transmits, routes, relays, and/or stores a data packet (e.g., the client device 102, the MTN nodes 106(1) . . . 106(N), the data servers 108).

At block 702, a node monitors data packets that have been generated by, communicated through, received at, transmitted by, routed by, relayed by, and/or stored at the node. In various embodiments the monitoring may be at the node level (e.g., a single trace file for the node) or the layer level (e.g., multiple trace files for the node), as discussed above.

At block 704, the node creates and logs one or more entries for the monitored data packets in a trace file 306. As discussed above, each entry may include one or more fields that represent a trace ID 306 that distinguishes the data packet from other data packets. In various embodiments, the node may log separate entries for the data packet in different trace files associated with different layers for the node. Alternatively, the node may log separate entries for the data packet associated with different layers in a single trace file for the node.

At block 706, the node timestamps each trace ID 306 when logging the entry in the trace file 306. Accordingly, the node may access a time source to determine the timing information for each entry.

At block 708, the node sends the one or more trace files to the QoE optimization system 110. In various embodiments, the node may send the trace files to the QoE optimization system 110 in response to a request (e.g., periodic request or on-demand request) from the QoE optimization system 110. In an alternative embodiment, the node may be aware or a reporting schedule, and proactively send the trace files to the QoE optimization system 110 in accordance with the reporting schedule.

Figure 8:
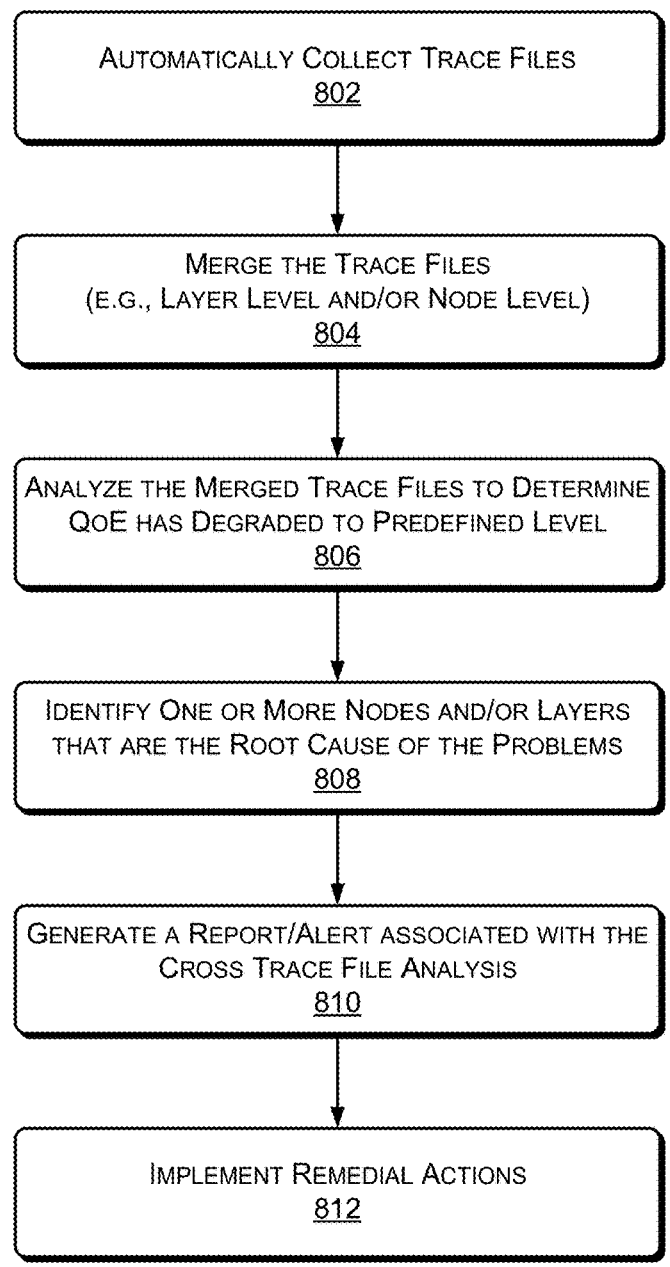
FIG. 8 is a flow chart of an example process for collecting and correlating the trace files so that network analysis can be performed, in accordance with embodiments of the disclosure.

FIG. 8 shows a flow chart of an example process 800 for collecting trace files, merging the trace files, and performing network communications analysis. The example process 800 may be performed by the components that are part of the QoE optimization system 110.

At block 802, the trace file receiving module 410 may automatically collect the trace files from multiple nodes (e.g., the client device 102, the MTN nodes 106(1), and the data servers 108). In various embodiments, the trace file receiving module 410 may automatically collect the trace files in accordance with a periodic schedule. In various embodiments, the trace file receiving module 410 may automatically collect the trace files from an identified subset of nodes in the MTN 104.

At block 804, the trace file correlation module 414 merges the trace files collected. In various embodiments, the merging may include merging trace files corresponding to different layers at a single node (e.g., layer level), as well as merging trace files received from different nodes (e.g., node level).

At block 806, the cross file analysis module 416 analyzes the merged trace files to determine whether the QoE for users of client devices has degraded to a predefined level. In various embodiments, the cross file analysis module 416 performs analysis using timestamps of trace IDs that match a single data packet, a request/response packet pair, a group of data packets that are part of an established communication session. Moreover, as part of the analysis, the cross file analysis module 416 may identify (e.g., via the KPI module 420 and/or the controls module 418) one or more KPIs to evaluate and a particular service level or service goals associated with the KPI. The QoE may be found to be degraded to the predefined level if the particular service level is not being satisfied (e.g., webpage loading time is longer than two seconds, RTT is greater than one second, etc.). As part of the analysis, the cross file analysis module 416 may employ the trace sorting module 422 to sort the merged trace IDs so the analysis can be performed.

At block 808, the cross file analysis module 416 identifies one or more nodes and/or one or more layers within the identified nodes that may be the root cause of the problems contributing to the degraded QoE.

At block 810, the presentation and notification module 424 may format and generate a report or an alert to be conveyed via a GUI to a network administrator. The report or the alert may provide a result of the cross trace file analysis.

At block 812, the remedial action module 426 may implement remedial actions to address the problems contributing to the degraded QoE. In various embodiments, the remedial actions may be implemented automatically in accordance with predefined instructions in the controls module 418. In other embodiments, the remedial actions may be implemented in response to a selection and input provided to the controls module 418 by a network administrator.

Figure 9:
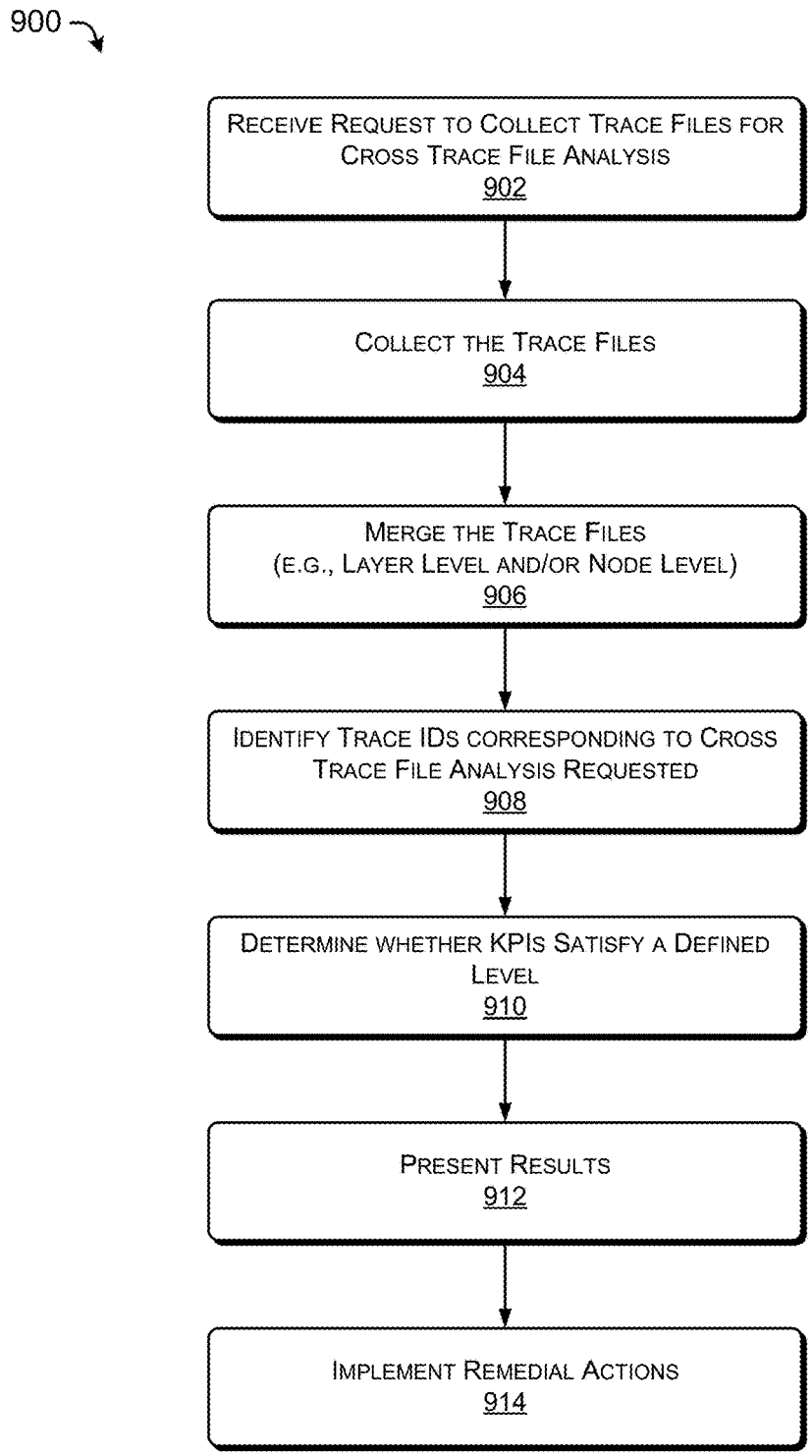
FIG. 9 is a flow chart of another example process for collecting and correlating the trace files so that network analysis can be performed, in accordance with embodiments of the disclosure.

FIG. 9 shows a flow chart of another example process 900 for collecting trace files, merging the trace files, and performing network communications analysis. The example process 900 may be performed by the components that are part of the QoE optimization system 110.

At block 902, the controls module 418 may receive a request from a network administrator to collect trace files from multiple different nodes for cross trace file analysis.

At block 904, the trace file receiving module 410 may collect the trace files from multiple nodes (e.g., the client device 102, the MTN nodes 106(1), and the data servers 108).

At block 906, the trace file correlation module 414 merges the trace files collected. In various embodiments, the merging may include merging trace files corresponding to different layers at a single node (e.g., layer level), as well as merging trace files received from different nodes (e.g., node level).

At block 908, the cross file analysis module 416 may identify one or more trace IDs that provide a basis for the cross trace file analysis being requested.

At block 910, the cross file analysis module 416 may determine, based on the identified trace IDs, whether KPIs associated with the requested cross trace file analysis are satisfying a defined level.

At block 912, the presentation and notification module 424 may format and the results to a network administrator requesting the analysis.

At block 914, the remedial action module 426 may implement remedial actions to address the problems.

Figure 10:
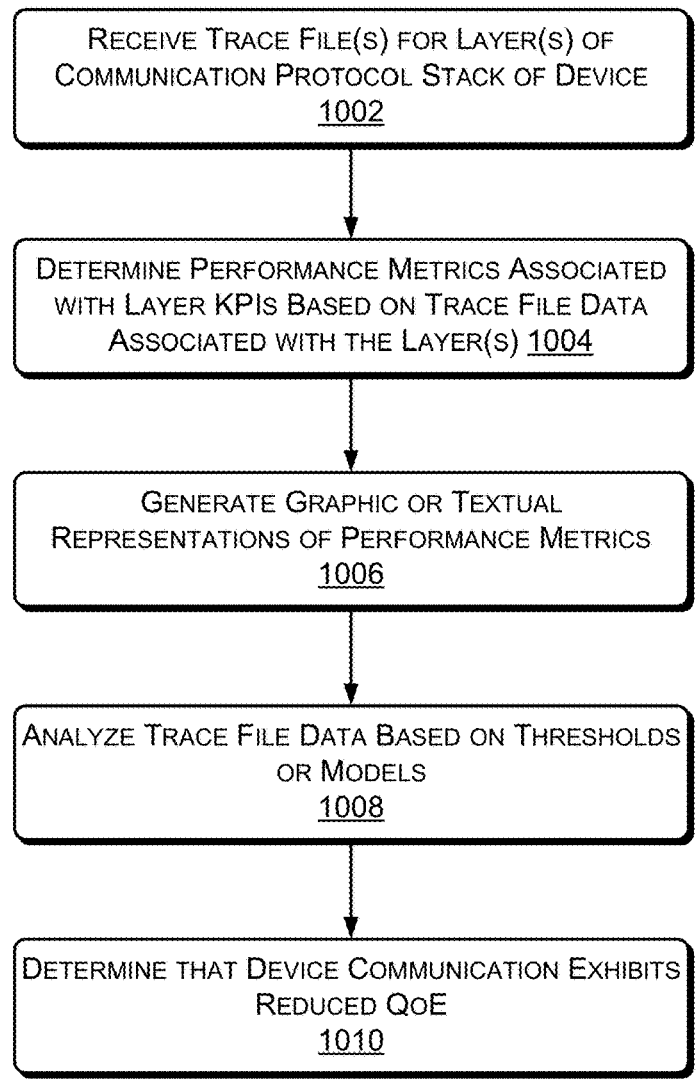
FIG. 10 shows a flow chart of another example process for receiving a trace file, determining performance metrics for data included in the trace file, and generating graphic or textual representations of the performance metrics.

FIG. 10 shows a flow chart of another example process 1000 for receiving a trace file, determining performance metrics for data included in the trace file, and generating graphic or textual representations of the performance metrics. The example process 1000 may be performed by the components that are part of the QoE optimization system 110.

At block 1002, the QoE optimization system 110 may receive a trace file from a device engaged in wireless communication. The trace file may include at least data associated with a radio layer of a communication protocol stack of the device. The device may be one of a user device, a telecommunications base station, a wireless access point, a radio network controller, or a core telecommunications network element. The trace file may be associated with a data collection and diagnostic logging tool for measuring radio frequency performance. In some embodiments, the trace file may also include data associated with an Internet layer, a network layer, or a transport layer of the communication protocol stack of the device. Alternatively, the QoE optimization system 110 may receive, at 1002, another trace file from the device, and the other trace file may include the data associated with the Internet layer, the network layer, or the transport layer of the communication protocol stack of the device.

At 1004, the QoE optimization system 110 may determine, for the device, one or more performance metrics associated with radio layer key performance indicators based at least in part on the data associated with the radio layer. The radio layer key performance indicators may include at least one of radio link control (RLC) retransmissions, packet loss, network signaling, radio resource control (RRC) state duration, radio state transition times, times spent in different radio states, number of radio state transitions, or reconfiguration response times. Also at 1004, the QoE optimization system 110 may determine, for the device, one or more additional performance metrics associated with key performance indicators for the Internet layer, the network layer, or the transport layer based at least in part on the data associated with the Internet layer, the network layer, or the transport layer. The key performance indicators for the Internet layer, the network layer, or the transport layer may include at least one of domain name service (DNS) round trip times (RTT), transmission control protocol (TCP) RTT, hypertext transfer protocol (HTTP) RTT, TCP retransmissions, TCP duplicate acknowledgements, TCP resets, TCP failures, delta frames, or sequence numbers.

At 1006, the QoE optimization system 110 may generate one or more graphic or textual representations of the one or more performance metrics. The graphic or textual representations include at least one of a graph, a chart, or a log representation (see, for example, FIGS. 12 and 13). Also, at 1006, the QoE optimization system 110 may generate one or more additional graphic or textual representations of the one or more additional performance metrics.

At 1008, the QoE optimization system 110 may analyze the data based on one or more of performance thresholds or performance models. At 1010, based on the analyzing, the QoE optimization system 110 may determine that the wireless communication exhibits a reduced QoE.

Figure 11:
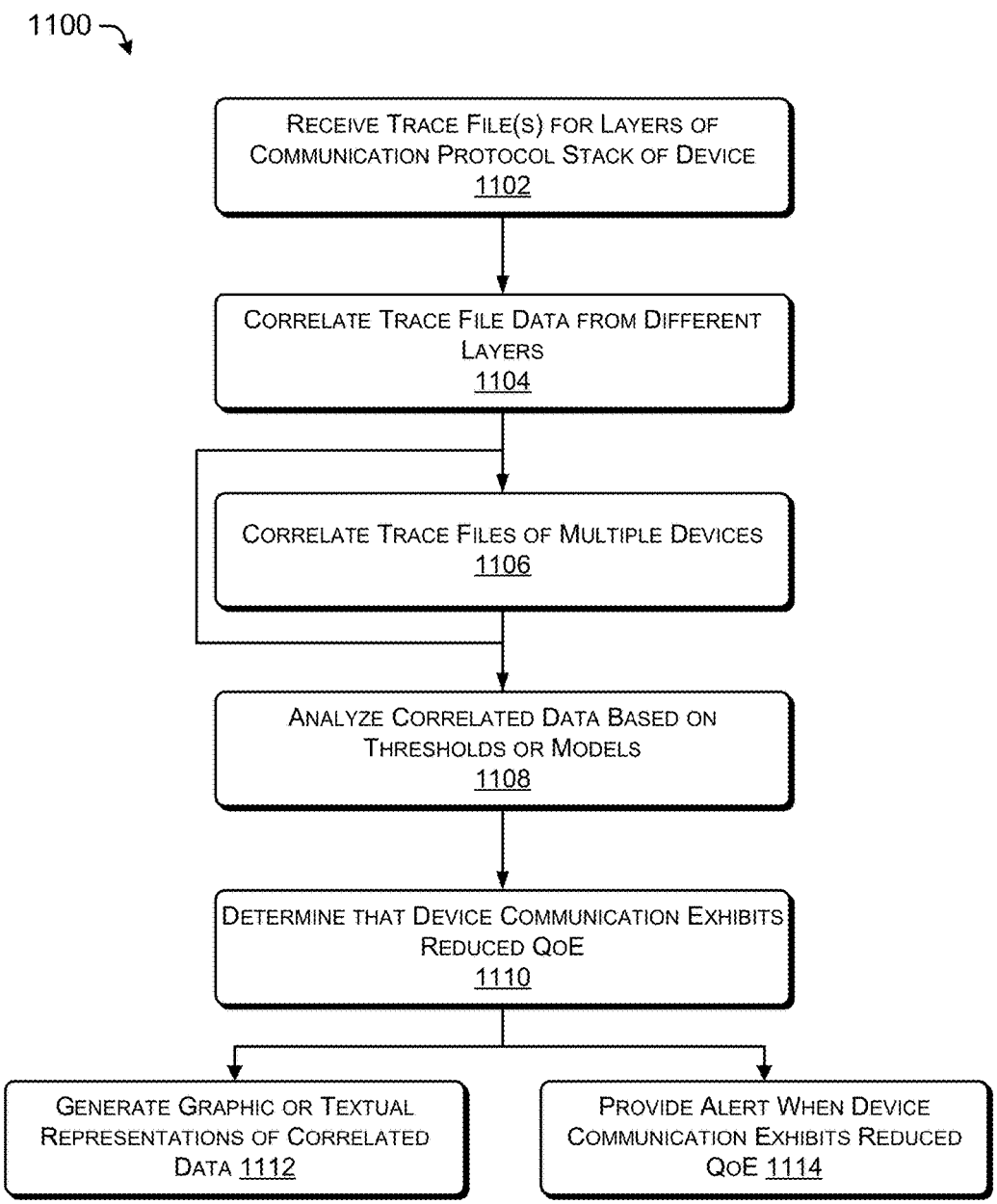
FIG. 11 shows a flow chart of another example process for receiving trace file(s), correlating trace file data associated with different layers of a device or with different devices, analyzing the correlated data based on thresholds or models, and determining that communication associated with the correlated data exhibits a reduced QoE.

FIG. 11 shows a flow chart of another example process 1100 for receiving trace file(s), correlating trace file data associated with different layers of a device or with different devices, analyzing the correlated data based on thresholds or models, and determining that communication associated with the correlated data exhibits a reduced QoE. The example process 1100 may be performed by the components that are part of the QoE optimization system 110.

At block 1102, the QoE optimization system 110 may receive a trace file from a device engaged in wireless packet-based communication. The trace file may include first data for a first layer of a communication protocol stack of the device and second data for a second layer of the communication protocol stack. The wireless packet-based communication may comprise data packets received at a user device from a remote service or remote website.

At 1104, the QoE optimization system 110 may correlate the first data with the second data based on a payload of a packet that is represented by the first data and the second data. The correlating may comprise correlating a representation of the payload in the first data with a representation of the payload in the second data.

At 1106, when multiple trace files are received from multiple devices engaged in or relaying the wireless packet-based communication, the QoE optimization system 110 may correlate those trace files.

At 1108, the QoE optimization system 110 may analyze the correlated data based on one or more of communication performance thresholds or communication performance models. If multiple trace files are correlated, the QoE optimization system 110 may also analyze the correlated trace files.

At 1110, based on the analyzing, the QoE optimization system 110 may determine that the wireless packet-based communication exhibits a reduced QoE.

At 1112, the QoE optimization system 110 may generate a graphic or textual representation of the correlated data. Alternatively or additionally, at 1114, the QoE optimization system 110 may provide an alert when the wireless packet-based communication exhibits a reduced QoE.

Figure 18:
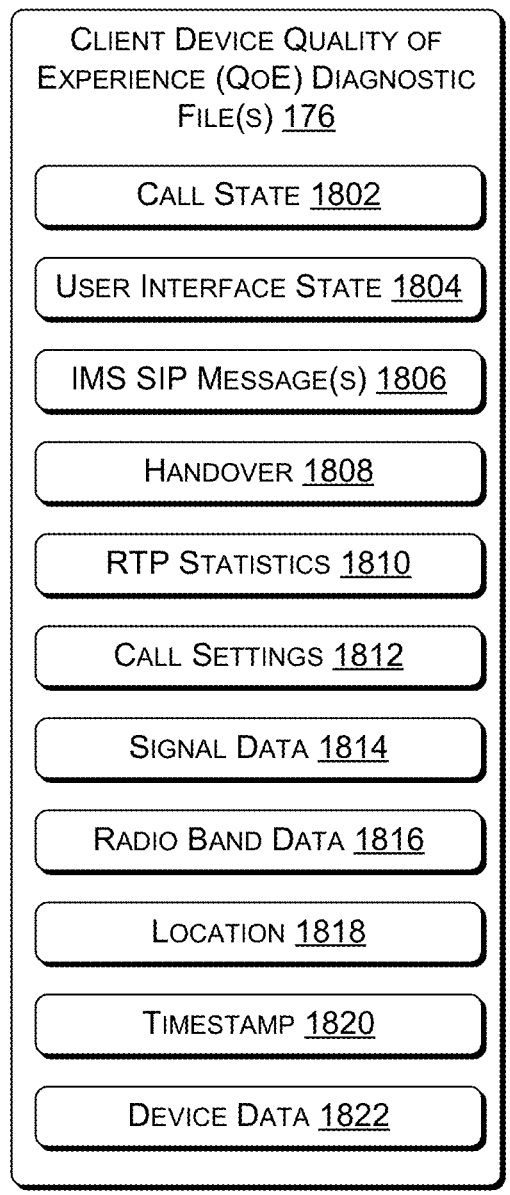
FIG. 18 depicts an example of a client device Quality of Experience (QoE) diagnostic file, in accordance with embodiments of the disclosure.

FIG. 18 depicts an example of a client device Quality of Experience (QoE) diagnostic file(s) 176, in accordance with embodiments of the disclosure. In various embodiments, the QoE diagnostic file(s) 176 may be generated by the client device QoE module 172 in FIG. 1C. In some embodiments, the client device QoE diagnostic file(s) 176 may include diagnostic files relating to modules, components, and operations of the client device 102 to track device operations and status. In some embodiments, the QoE diagnostic file(s) 176 may contain information generated, gathered, and/or collected on the client device 102 from which client device KPIs and/or QoE may be determined. The client device QoE diagnostic file(s) 176 may be configured in association with one or more communication or data exchange/formatting protocols such as TCP, IP, HTTP or other protocols directed to communicating or exchanging content over the MTN 104.

For example, the QoE diagnostic file(s) 176 may be configured in an extensible markup language (XML) based format such as JSON (JavaScript Object Notation). In some embodiments, the QoE diagnostic file(s) 176 may be transmitted by the client device 102 in addition to or instead of the client device trace file(s) 178, as illustrated in FIG. 1C. In various embodiments, client device QoE diagnostic file(s) 176 may include information relating to voice calls, video calls, and/or data transfers including client device 102. In some embodiments, the client device QoE diagnostic file(s) 176 may include a chronological diagnostic file or log indicating the activities or operations of the client device 102 when a call is to be made.

In various embodiments, the client device QoE diagnostic file(s) 176 may include data relating to call state 1802, user interface (UI) state 1804, IP Multimedia Subsystem (IMS) Session Initiation Protocol (SIP) message(s) 1806, handover 1808, Real-Time Transport Protocol (RTP) statistics 1810, call settings 1812, signal data 1814, radio band data 1816, location 1818, timestamp 1820, and/or device data 1822.

In various embodiments, the call state 1802 data may indicate when a call is being attempted, when a call is established (e.g., when a call is started ringing), when a call is connected (e.g., when voice or video data is commenced), and when a call is disconnected. In various embodiments, the call state 1802 is updated continuously during a call.

In various embodiments, the user interface (UI) state 1804 may indicate the input received at a user interface of the client device 1804. For example, the UI state 1804 may indicate that an input was received to initiate or terminate a call, mute or hold a call, input a telephone number or device identity, change a volume, etc. The UI state 1804 may track some or all of the input received at the client device 102, and may reflect the actual inputs or input attempts of a user. In some embodiments, the UI state 1804 may be limited to data for certain applications, such as an application on the client device configured for voice or video calling. In some embodiments, UI state 1804 may indicate received input from a touch screen, display, stylus, or various buttons such as a volume button or power button. The UI state 1804 may indicate if a received user input is successful or unsuccessful. The UI state 1804 may also track the data displayed on the display of the client device 1804, such as a screen displayed before, during, or after a call.

In various embodiments, the IP Multimedia Subsystem (IMS) Session Initiation Protocol (SIP) message(s) 1806 may include session information for each communication conducted by the client device 102. IMS SIP message(s) 1806 may include fields such as message type (e.g., text, data file, video, image, music, audio, etc.), session description protocol (SDP) parameters, and reason codes (e.g., issues messages, status codes, and return codes in response to events during operation). Examples of reason codes may include error messages indicating a detected error event during operation, or messages indicating the success of an operation during a communication operation.

In various embodiments, the handover 1808 data may log the handover operations and status of the client device for a communication. In some embodiments, the handover 1808 data may log the handover operations between base stations, between access points, or between base stations and access points. For example, the handover 1808 may indicate single radio voice call continuity (SRVCC), circuit-switched fallback (CSFB), inter-system (inter-radio access technology (RAT)) mobility (e.g., transitions between 2G/3G and LTE), and LTE X2 handovers.

In various embodiments, the Real-Time Transport Protocol (RTP) statistics 1810 indicate various packet statistics such as packet loss, packet delay, delay jitter, bytes sent/received, packets sent/received, total bytes, total packets, packet loss rate, packet discard rate, burst loss rate and burst length, gap loss rate and gap length, round trip delay, one way delay, echo path delay, collision rate, etc.

In various embodiments, the call settings 1812 may indicate settings of the client device, such as a mode of operation or call preferences. For example, the call settings 1812 may indicate whether voice-over LTE (VoLTE) is activated or deactivated, whether WiFi Calling is preferred or allowed, call registration, subscriber identity module (SIM) card provisioning, etc.

In various embodiments, the signal data 1814 may include parameters indicating a signal strength and/or quality, such as a received signal strength indicator (RSSI), reference signal received power (RSRP), reference signal received quality (RSRQ), signal-to-interference-plus-noise (SINR) ratio, received signal code power (RSCP), Ec/Io (e.g., the ratio of the received energy per chip (code bit) and the interference level (in dB)), signal-to-noise ratio (SNR), etc.

In various embodiments, the radio band data 1816 may indicate if the client device is using a particular band (e.g., 2, 4, or 12) or carrier aggregation (e.g., 2 and 4). In some embodiments, the radio band data 1816 may include an uplink frequency, a downlink frequency, a width of a band, duplex spacing, and/or a band gap.

In various embodiments, the location 1818 may indicate the location of the client device at any instant before, during, or after a communication or a communication attempt. The location 1818 may be determined by GPS location data, base station identity, or a combination of location sources. In some embodiments, the location 1818 may include a mobile network code (MNC) and a mobile country code (MCC) used in combination to uniquely identify a mobile network carrier network. In some embodiments, the location 1818 may include a base station or cell identity, and/or latitude, longitude, and altitude information.

In various embodiments, the timestamp 1820 may uniquely identify a time of some or all data points included in the client device QoE diagnostic file(s) 176. In some embodiments, the timestamp 1820 may be provided by a local time source or a remote time source. For example, each operation log, report, or intent may have an associated timestamp 1820.

In various embodiments, the device data 1822 may indicate device and/or system information for the client device 102 such as make, model, operating system, operating version, hardware components, software components, chip manufacturers, upgrade history, etc. The device data 1822 may also indicate any applications and/or software installed or operating on the client device 102, as well as a software version for any associated software.

Figure 19:
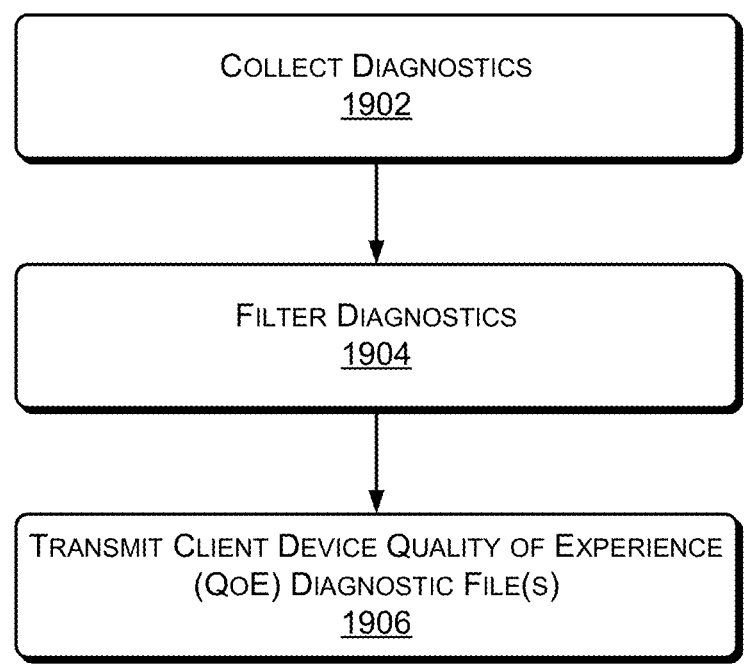
FIG. 19 is a flow chart of an example process for collecting diagnostics, filtering diagnostics, and transmitting a client device QoE diagnostic file, in accordance with embodiments of the disclosure.

FIG. 19 is a flow chart of an example process 1900 for collecting diagnostics, filtering diagnostics, and transmitting a client device QoE diagnostic file, in accordance with embodiments of the disclosure. In some embodiments, the client device QoE diagnostic file corresponds to the client device QoE diagnostic file(s) 176 in FIGS. 1C and 18. The example process 1900 may be performed by the client device 102, for example.

At 1902, diagnostics are collected. In some embodiments, diagnostics may include device reports, operations logs, intents, or other data to be used to determine the client device KPIs and/or QoE upon further analysis. Diagnostics may be collected in the client device 102 by the client device QoE module 172. In some embodiments, the client device QoE module 172 may operate as a background process on the client device 102 (e.g., as a headless process or a headless trace collector) and may collect diagnostics, logs, reports, or intents (i.e., messages between applications in the client device 102, typically for further action) from the hardware and/or software running on the client device 102. In some embodiments, the diagnostics are collected at scheduled intervals, such as every 5 seconds, every 5 minutes, daily, weekly, or any other scheduled interval. In some embodiments, the diagnostics are collected in response to a request (e.g., a periodic request or an on-demand request) from the QoE optimization system 110. In an alternative embodiment, the client device 102 may be aware of a reporting schedule, and may proactively collect the diagnostics in accordance with the reporting schedule. In some embodiments, diagnostics are collected in response to an event such as initiating a communication, ending a communication, upon detecting an error event, or in response to diagnostics data, log data, or an intent being generated by an application or software operating on the client device 102. In some embodiments, diagnostics to be collected include the diagnostics discussed in connection with FIG. 18 (or may include the messages discussed in connection with FIG. 21). In some embodiments, the diagnostics to be collected are generated as a debugging file for various applications, processes, or threads, and are not generated by the client device QoE module 172. In some embodiments, the diagnostics are collected passively by various applications writing files to a folder, file, or directory, while in other embodiments, various components are actively polled and data is collected.

At 1904, diagnostics are filtered. In some embodiments, filtering is performed in response to detecting an error message, while in some embodiments, filtering is performed based on a call state, progress of a call, or a unique call identity. In some embodiments, filtering is performed to reduce the amount of data to be transmitted in a client device QoE diagnostic file. In some embodiments, the diagnostics filtering 1904 is performed in response to an available bandwidth, an amount of traffic on a network, or a priority of an error detected. In some embodiments, diagnostics filtering 1904 is performed to include all operations logs, device reports, diagnostic files, or intents associated with a particular communication (e.g., a voice call), or to include all data associated with a communication location (e.g., if diagnosing a root cause for a particular location). For example, operation 1904 may be performed to filter and select the device reports, logs, or intents that are relevant to the type of KPIs that are monitored to determine a device QoE. In one non-limiting example, a client device may generate 20 logs for a voice call and 10 logs for a data call such as web browsing. If those logs are reported in the client device in mixed order, the operation 1904 may be performed to identify logs for voice calls and separate the 20 voice call logs to be included in a client diagnostic QoE file. In some embodiments, the diagnostics filtering 1904 is performed in response to user preferences. In some embodiments, the diagnostics filtering 1904 may include anonymizing and encrypting the diagnostics. In some embodiments, the diagnostics filtering 1904 includes formatting the data into a standardized format. For example, the diagnostics filtering 1904 may include storing multiple intents collected in operation 1902 into an extensible markup language (XML) based format such as JSON (JavaScript Object Notation).

At 1906, client device QoE diagnostic file(s) are transmitted. In some embodiments, the client device QoE diagnostic file(s) are transmitted in real time during or throughout a device communication. The client device QoE diagnostic file(s) may be transmitted to the QoE analyzer 180 of FIG. 1C, for example, when network traffic is low, at a minimum, or during off-peak times. For example, the client device QoE diagnostic file(s) may be transmitted only when a client device 102 is connected to a WiFi network, or may be transmitted at night when network traffic is low. In some embodiments, the client device QoE diagnostic file(s) 176 may be transmitted in addition to, or instead of, the client device trace file(s) 178 to the QoE analyzer 180.

Figure 20:
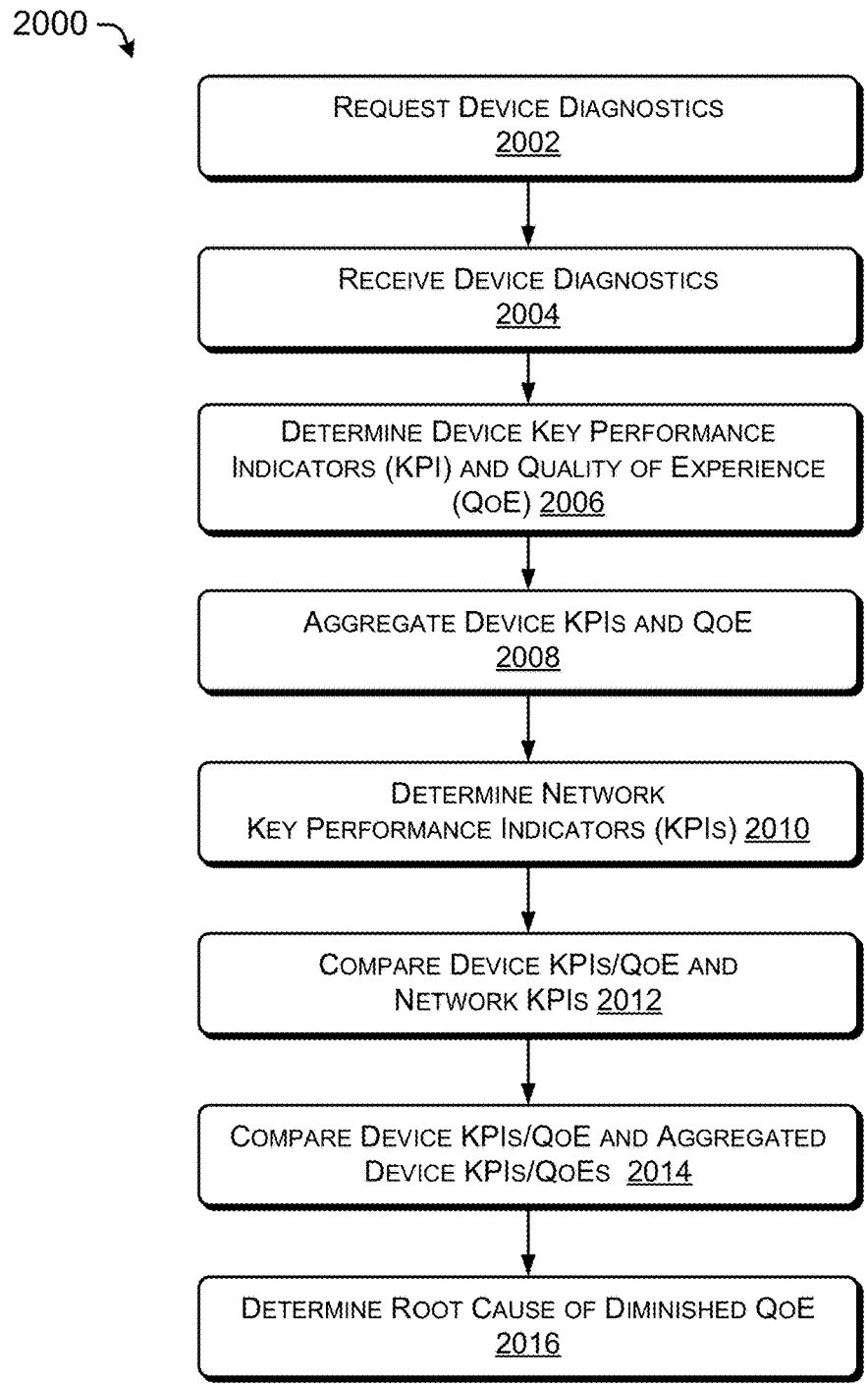
FIG. 20 is a flow chart of an example process for receiving and analyzing device diagnostics, in accordance with embodiments of the disclosure.

FIG. 20 is a flow chart of an example process 2000 for receiving and analyzing device diagnostics, in accordance with embodiments of the disclosure. The example process 2000 may be performed by the components that are part of the QoE optimization system 110, for example, by the QoE analyzer 180, while in some embodiments, some or all operations in process 2000 may be performed by a client device.

At 2002, device diagnostics are requested. In some embodiments, the QoE analyzer 180 may request diagnostics from the client device 102. In some embodiments, the request 2002 may include setting a schedule for the client device to send the device diagnostics to the QoE analyzer 180, while in some embodiments, the request may be an on-demand request. In some embodiments, the request for device diagnostics 2002 may specify the number, type, frequency, format, and specifications for the device diagnostics, and in some embodiments, the request 2002 may include a request for a client device QoE diagnostic file(s) 176. In some embodiments, the request 2002 may be in response to an identification of a network issue, such as an identification by the QoE trending module 186 that a network issue is present. In some embodiments, the request 2002 may be in response to a customer or user complaint or report that QoE is reduced or diminished.

At 2004, device diagnostics are received. In some embodiments, device diagnostics are received as one or more client device QoE diagnostic file(s) 176. For example, device diagnostics may be received as a JSON XML file from the client device, and may include device reports, operations logs, device intents, and/or information relating to a device communication. In some embodiments, a plurality of device diagnostics are received from a single client device, and in some embodiments, a plurality of device diagnostics are received from a plurality of client devices. In some embodiments, the device diagnostics that are received are the client device QoE diagnostic file(s) transmitted in operation 1906.

At 2006, device KPIs and/or QoE are determined from the device diagnostics received in operation 2004. In some embodiments, the device reports, operations logs, device intents, and/or information relating to a device communication is analyzed to determine the device KPIs, from which the device QoE may be determined. For example, if a device KPI includes an indication of "call setup time," the device diagnostics are analyzed to determine the device operations and timestamps involved in the call setup operations to determine a "call setup time." By way of another example, a voice quality device KPI may be predicted based on Real-Time Packet Protocol (RTP) data (such as a RTP loss rate) and SIP Message trace data (such as a codec type and sampling rate). As may be understood in the context of this disclosure, any number of device KPIs may be determined in operation 2006.

At 2008, device KPIs and/or QoE are aggregated. In some embodiments, device KPIs and/or QoE are aggregated for an individual device over a time period, while in some embodiments, device KPIs and/or QoE are aggregated for a plurality of devices for an individual time point, over a time period, for a location, device characteristic, or some other aggregation metric or parameter. In some embodiments, device KPIs and/or QoE are aggregated and indexed by one of a device type, a device location, a QoE problem, or an access technology. For example, device KPIs and/or QoE for a particular device are indexed to create a database of KPIs and/or QoE specific to a device type, hardware component type, software component type, etc. In another example, all device KPIs and/or QoE for a particular location are aggregated, while in another example, device KPIs for a QoE problem, such as an increased drop call rate, may be aggregated. In some examples, device KPIs and/or QoE may be indexed according to access technology, such as 2G/3G, LTE, VoLTE, Wi-Fi Calling, etc. In some embodiments, device diagnostic files are aggregated prior to determining the device KPIs and/or QoEs.

At 2010, network KPIs is determined. In some embodiments, the network KPIs may be determined based on the trace files 174 or 180 received by the QoE analyzer 180. In some embodiments, the network KPIs may refer to QoS data. In some embodiments, the network KPIs may be similar to the client device KPIs and/or QoE experienced at the client device 102.

At 2012, the device KPIs and/or QoE determined at 2006 and the network KPIs determined at 2010 are compared. In some embodiments, the comparison operation 2012 may be performed to detect any reduced or diminished QoE issues. For example, a drop call rate may be determined based on the device KPIs and/or QoE determined at 2006, while a drop call rate may also be determined based on the network KPIs determined at 2010. In some embodiments, the device drop call rate may be compared to the network drop call rate. In one example, a network drop call rate that is lower than a device drop call rate may indicate the possibility of reduced or diminished QoE.

At 2014, device KPIs and/or QoE and aggregated device KPIs and/or QoEs are compared. In some embodiments, device KPIs and/or QoE for an individual device are compared to aggregated device KPIs and/or QoEs associated with the individual device. In some embodiments, device KPIs and/or QoE for an individual device are compared to aggregated device KPIs and/or QoEs associated with a plurality of client devices.

An example of process 2000 is described below. By way of example, a first client device 102 may experience a dropped call at a first location (e.g., reduced or diminished QoE). The first client device 102 may send the client device QoE diagnostic file(s) 176 indicating the client device conditions (e.g., operations logs, device intents, device reports) at the time the call was dropped. The QoE analyzer 180 may receive the client device QoE diagnostic file(s) 176 (e.g., operation 2004), may determine the device KPIs and/or QoE in operation 2006, and may compare the determined client device KPIs and/or QoE with aggregated device KPIs and/or QoEs that the QoE analyzer 180 previously received and determined from a plurality of client devices (e.g., operations 2006 and 2008). In this example, the aggregated device KPIs and/or QoEs may be indexed by the device type, the QoE problem, and/or the client device location. Accordingly, the first client device KPIs and/or QoE indicating the dropped call at the first location (e.g., the diminished QoE) is compared to the aggregated device KPIs and/or QoEs relevant to the first location (e.g., operation 2014).

At 2016, the root cause of diminished QoE is determined. In the example above, the device KPIs and/or QoE from a first client device are compared with the aggregated device KPIs and/or QoEs to determine the root cause of the dropped call at the first location. In this example, the signal strength of the first client device at the first location may have been low before the dropped call. By comparing the signal strength experienced at the first client device with the aggregated device KPIs and/or QoE, the root cause can be determined. For example, if the aggregated device KPIs and/or QoE at the first location also demonstrate a low signal strength, the data may suggest that the signal strength is low at the first location, and the reception may need to be upgraded (e.g., by a service provider). However, if the aggregated device KPIs and/or QoE at the first location indicate that the signal strength is not diminished or reduced (e.g., other devices are not having similar problems), the root cause of the diminished QoE may be the first client device. In some embodiments, a parameter may be considered "low" if the parameter is below a performance threshold or model, or below an acceptable mean or median value determined via the aggregated device diagnostics.

In another example, aggregated device KPIs and/or QoE (e.g., aggregated in operation 2008) may indicate a diminished QoE. In some embodiments, the aggregated device KPIs and/or QoEs may be indexed by device model or by operating system version. In one example, it may be determined that devices with a particular operating system version may be experiencing diminished QoE. In such a case, the root cause of the QoE may be determined (e.g., in operation 2016) to be the particular operating system version. In another example, the diminished QoE may be particular to a device type. In such as case, the root cause of the diminished QoE may be the device type.

In a further example, the aggregated device KPIs and/or QoEs may be indexed by location. If the aggregated data show a problem trend at the particular location (or at the particular location and at a particular time), the root cause of the QoE may be determined (e.g., in operation 2016) to be a regular or transient network issue.

In some embodiments, the root cause of the diminished QoE may be determined (e.g., in operation 2016) without reference to the aggregated device KPIs and/or QoE. In one example, a client device QoE diagnostic file(s) 176 may indicate that a call attempt was made (e.g., call state=attempt), followed by an error code of "not provisioned" (e.g., call setting=non-provisioned), followed by an indication that the client device was disconnected (e.g., call state=disconnect). In such an example, the root cause of diminished QoE may be determined at 2016 to be a SIM card that is not provisioned. Further, in some embodiments, the QoE analyzer 180 may perform self-healing by sending a software update to the client device in order to provision the SIM card, thereby correcting the error.

By way of another example, the root cause of the diminished QoE may be determined (e.g., in operation 2016) by reviewing the client device QoE diagnostic file(s) 176. In one example, the client device QoE diagnostic file(s) 176 may include an operations log (or device report or intents) reflecting a use of a codec in the client device communication. The client device QoE diagnostic file may indicate that a codec changeover operation occurred before a call failed. In such an event, the codec transition operation may be determined to be the root cause of the diminished QoE. Further, it may be understood in the context of this disclosure that network-based KPIs may not be able to determine the root cause of this diminished QoE in this example because the codec transition may not be transparent to network-based KPIs.

Figure 21:
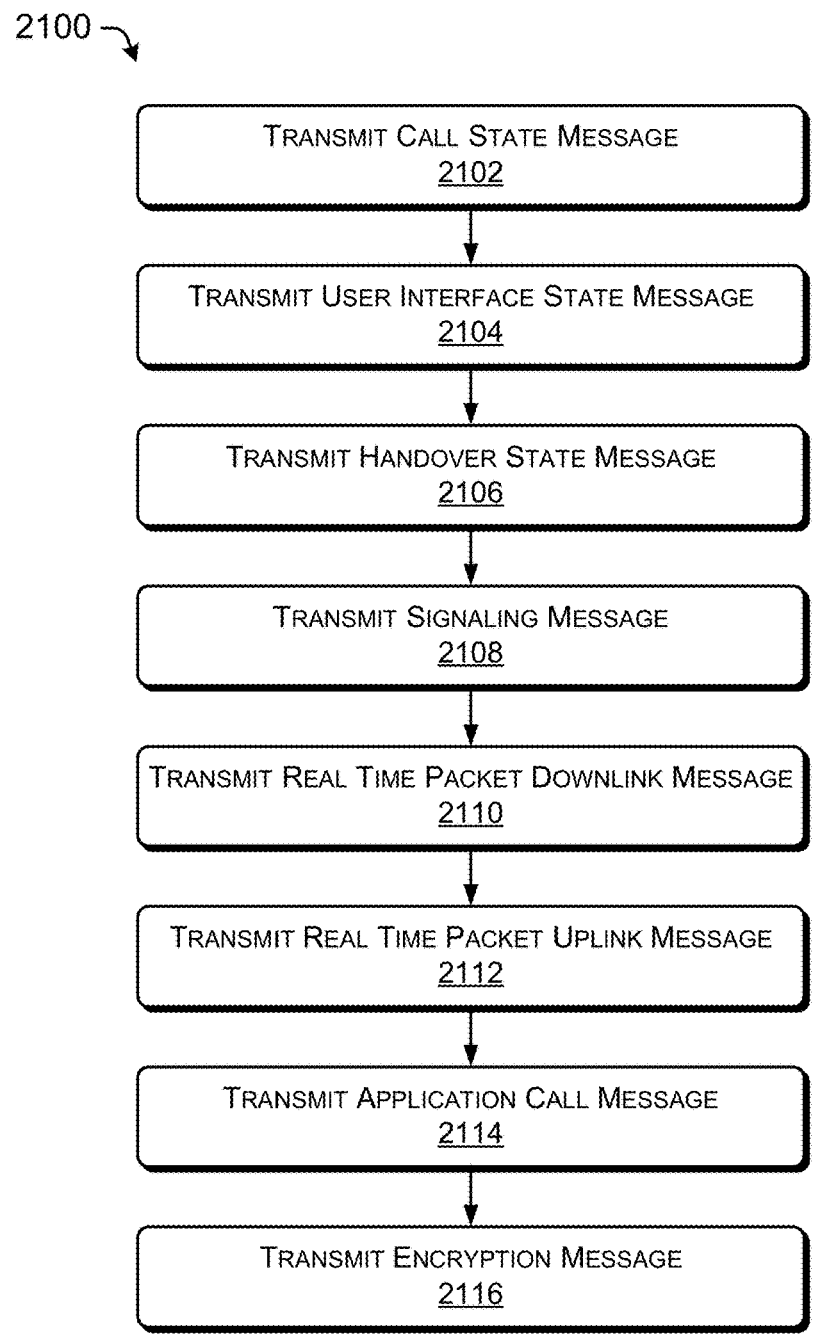
FIG. 21 is a flow chart of an example process for transmitting diagnostic messages, in accordance with embodiments of the disclosure.

FIG. 21 is a flow chart of an example process 2100 for generating and/or transmitting diagnostic messages, in accordance with embodiments of the disclosure. The example process 2100 may be performed by the client device 102, for example.

Process 2100 may include generating and/or transmitting some or all of messages 2102-2116. In some embodiments, the diagnostic messages 2102-2106 may not generated and/or transmitted sequentially, but rather individually upon detecting the occurrence of a triggering event. In some embodiments, the messages 2102-2116 may correspond to a client device QoE diagnostic file(s) 176. In some embodiments, the messages 2102-2116 may be generated individually and transmitted in a single client device QoE diagnostic file. The order in which the operations/messages are described is not intended to be construed as a limitation, and any number of the described operations can be combined in any order and/or in parallel to implement the process and/or to send the messages described herein.

At 2102, a call state message may be generated and/or transmitted. In various embodiments, the call state message may be generated and/or transmitted when the state of a voice call changes. Changes in a call state may include changes to or from the following call states: ATTEMPTING, ESTABLISHED, CONNECTED, DISCONNECTING, HELD, ENDED, INCOMING, MUTED, UNMUTED, CSFB_STARTED, CSFB_SUCCESSFUL, CSFB_FAILED, SRVCC_STARTED, SRVCC_SUCCESSFUL, SRVCCC_FAILED, ASRVCC_STARTED, ASRVCC_SUCCESSFUL, ASRVCC_FAILED, EPDG_HO_STARTED, EPDG_HO_SUCCESSFUL, and/or EPDG_HO_FAILED.

At 2104, a user interface (UI) state message is generated and/or transmitted. In various embodiments, the UI state message may be generated and/or transmitted when the UI state of the call changes. In some embodiments, the UI state message is generated and/or transmitted only during an active voice call session. Changes in UI state may include changes to or from the following UI states: CALL_PRESSED, END_PRESSED, MUTE_PRESSED, UNMUTE_PRESSED, HOLD_PRESSED, UNHOLD_PRESSED, CALL_CONNECTED, CALL_DISCONNECTED, RINGING, and SCREEN_ON, SCREEN_OFF.

At 2106, a handover state message may be generated and/or transmitted. In various embodiments, the handover state message may be generated and/or transmitted when an ongoing call transfers or handovers from one channel connected to the network to another channel. In some embodiments, the handover state message is generated and/or transmitted only during an active voice call session. Handover state messages may be transmitted with one or more of the following handover state information: INTER_HO_STARTED, INTER_HO_FAILED, INTER_HO_SUCESSFUL, INTRA_HO_STARTED, INTRA_HO_FAILED, INTRA_HO_SUCCESSFUL, and MEASUREMENT_REPORT_DELIVERED.

At 2108, a signaling message is generated and/or transmitted. In various embodiments, the signaling message may indicate when an IP Multimeda Subsystem (IMS) Session Initiation Protocol (SIP) message is delivered or sent by the client device 102 during an active packet switched voice call. In some embodiments, the signaling message may include the contents of the IMS SIP message in the signaling message.

At 2110, a Real-Time Transport Protocol (RPT) downlink (DL) message is generated and/or transmitted. In some embodiments, the RPT DL message may be generated and/or transmitted at regularly schedule intervals during an active call. In some embodiments, the RTP DL message may include the RTP DL loss rate, RPT DL delay (e.g., end-to-end round trip delay between selected packets in a flow), RTP DL jitter (e.g., delay between packets due to network congestion, improper queuing, or configuration errors), and/or RTP DL measured period.

At 2112, a RTP upload message is generated and/or transmitted. In some embodiments the RTP upload message may include statistics similar to the RTP DL message, but directed to uplink packets.

At 2114, an application call message is generated and/or transmitted. In various embodiments, the application call message indicates when a mobile originated call was initiated. In various embodiments, the application call message may indicate the particular application initiating the call on the client device.

At 2116, an encryption message is generated and/or transmitted. In various embodiments, the encryption message indicates when the client device has completed negotiating an encryption scheme with a network.

An example of process 2100 is provided below. To initiate a voice call at a first client device, a user presses a "SEND" button in a user interface of the first client device. In such an example, a message 2104 may be generated by the first client device (e.g., indicating "CALL_PRESSED"). Next, the first client device may initiate the voice call in an application operating in the first client device, and may generate a message 2102 indicating the call state (e.g., "ATTEMPTING"). In connection with initiating the voice call, the first client device transmits a request to the network, the network responds to the first client device that the voice call is established, and the first client device begins outputting a ringback tone. Accordingly, the first client device may generate a message 2102 (e.g., "ESTABLISHED"). A second client device may answer the voice call request from the first client device, and accordingly, the first client device may generate a message 2102 indicating the updated call state (e.g., "CONNECTED"). As the voice call is conducted, the first client device monitor the uplink and/or downlink and generate messages indicating the connection status. For example, the first client device may receive 100 percent of the voice packets sent from the second client device for a particular time period, and may generate a RTP DL message 2110 indicating a zero-percent loss of packets. In a subsequent time period, the first client device may receive 75 percent of the voice packets sent from the second client device, and may generate a RTP DL message 2110 indicating a 25 percent loss. Next, the first client device may initiate a handover to a 3G network, and may generate a handover state message 2106 indicating this transition (e.g., "INTER_HO_STARTED"). In this example, after the handover is successful (and message 2106 indicating "INTER_HO_SUCCESSFUL" is generated), the call may be dropped, and the first client device generates a handover state message 2106 indicating this state (e.g., "DISCONNECTED"). As will be understood in the context of this disclosure, these messages may be transmitted in real time, or may be combined into a single report (e.g., a client device diagnostic file formatted as a single JSON container) and may be sent to a network node (e.g., at night) for analysis to determine the first client device KPIs and/or QoE. As will be further understood in the context of this disclosure, this example is illustrative, and a voice call may include any number of generated messages.

As described above, FIGS. 22-24 are examples of graphic representations of aggregated device QoE metrics, in accordance with embodiments of the disclosure. In some embodiments, the graphic representations 2200, 2300, and 2400 may be determined by the QoE analyzer 180 for an individual client device 102, or may be determined by the QoE analyzer 180 and/or the QoE trending module 186 for aggregated data representing a plurality of devices over a period of time. In FIG. 22, the graphic representation 2200 is an analysis of device drop call rates per regions or markets. In FIG. 23, the graphic representation 2300 is a graph of drop call rates indexed according to device model and a source of a call drop. In FIG. 24, the graphic representation 2400 is a graph of a drop call rate indexed by access technology over a period of time T1, T2, T3, T4, and T5. Any number of other types of charts and diagrams for client device QoEs may also or instead be generated.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   receiving, by a network component from a client device, at least one diagnostic file including information about operations performed by the client device in association with one or more communications over a network that were at least attempted by the client device;
   analyzing, by the network component, the at least one diagnostic file to determine a device Quality of Experience (QoE) specific to the client device at a location within the network;
   determining, by the network component, that the device QoE indicates a degraded QoE for the client device at the location because the device QoE does not satisfy a QoE goal;
   in response to determining that the device QoE indicates the degraded QoE for the client device at the location, comparing, by the network component, the device QoE specific to the client device against an aggregated QoE for the location generated from diagnostic files submitted by one or more other client devices; and
   determining, by the network component, a root cause of the degraded QoE for the client device at the location based at least in part on the comparing.

2. The method of claim 1, wherein the at least one diagnostic file includes state information indicating a state of the client device for a voice communication and location information indicating the location of the client device for the voice communication.

3. The method of claim 2, wherein the state information includes at least an error message associated with a dropped call and wherein the location information includes the location of the client device at a time of the dropped call.

4. The method of claim 1, wherein the device QoE is determined as a device drop call rate for the client device.

5. The method of claim 4, further comprising:
using a network key performance indicator (KPI) to determine a network call drop rate,
wherein the QoE goal is based at least in part on the network call drop rate, and
wherein the network component determines that the device QoE indicates the degraded QoE when the network call drop rate is lower than the device call drop rate.

6. The method of claim 1, further comprising:
updating the aggregated device QoE based on the at least one diagnostic file received from the client device; and
analyzing the aggregated device QoE to determine at least one QoE trend.

7. The method of claim 6, further comprising indexing the aggregated device QoE according to at least one of a device type, a device location, a QoE problem, or an access technology.

8. The method of claim 1, wherein the root cause is determined to be a first problem with the network if the comparing shows that the device QoE is within a predefined similarity threshold to the aggregated QoE or a second problem with the client device if the comparing shows that the device QoE is outside the predefined similarity threshold to the aggregated QoE.

9. One or more non-transitory computer-readable media having computer-executable instructions stored thereon that, when executed by a computing device, cause the computing device to perform operations comprising:
receiving at least one diagnostic file from a client device, the at least one diagnostic file including information about operations performed by the client device in association with communications over a network that were at least attempted by the client device;
analyzing the at least one diagnostic file to determine a device Quality of Experience (QoE) specific to the client device at a location within the network;
determining that the device QoE indicates a degraded QoE for the client device at the location because the device QoE does not satisfy a QoE goal;
in response to determining that the device QoE indicates the degraded QoE for the client device at the location, comparing the device QoE specific to the client device against an aggregated QoE for the location generated from diagnostic files submitted by one or more other client devices; and
determining a root cause of the degraded QoE for the client device at the location based at least in part on the comparing.

10. The one or more non-transitory computer-readable media of claim 9, wherein the at least one diagnostic file includes state information indicating a state of the client device for a voice communication and location information indicating the location of the client device for the voice communication.

11. The one or more non-transitory computer-readable media of claim 10, wherein the state information includes at least an error message associated with a dropped call and wherein the location information includes the location of the client device at a time of the dropped call.

12. The one or more non-transitory computer-readable media of claim 9, wherein the device QoE is determined as a device drop call rate for the client device.

13. The one or more non-transitory computer-readable media of claim 12, wherein the operations further comprise:
using a network key performance indicator (KPI) to determine a network call drop rate,
wherein the QoE goal is based at least in part on the network call drop rate, and
wherein the network component determines that the device QoE indicates the degraded QoE when the network call drop rate is lower than the device call drop rate.

14. The one or more non-transitory computer-readable media of claim 9, wherein the operations further comprise:
updating the aggregated device QoE based on the at least one diagnostic file received from the client device; and
analyzing the aggregated device QoE to determine at least one QoE trend.

15. The one or more non-transitory computer-readable media of claim 14, wherein the operations further comprise indexing the aggregated device QoE according to at least one of a device type, a device location, a QoE problem, or an access technology.

16. The one or more non-transitory computer-readable media of claim 9, wherein the operations further comprise anonymizing and encrypting the at least one diagnostic file.

17. A system comprising:
one or more processors;
a memory;
one or modules stored in the memory and executable by the one or more processors to perform operations comprising:
receiving at least one diagnostic file from a client device, the at least one diagnostic file including information about operations performed by the client device in association with communications over a network that were at least attempted by the client device;
analyzing the at least one diagnostic file to determine a device Quality of Experience (QoE) specific to the client device at a location within the network;
determining that the device QoE indicates a degraded QoE for the client device at the location because the device QoE does not satisfy a QoE goal;
in response to determining that the device QoE indicates the degraded QoE for the client device at the location, comparing, by the network component, the device QoE specific to the client device against an aggregated QoE for the location generated from diagnostic files submitted by one or more other client devices; and
determining a root cause of the degraded QoE for the client device at the location based at least in part on the comparing.

18. The system of claim 17, wherein the at least one diagnostic file includes state information indicating a state of the client device for a voice communication and location information indicating the location of the client device for the voice communication.

19. The system of claim 18, wherein the state information includes at least an error message associated with a dropped call and wherein the location information includes the location of the client device at a time of the dropped call.

20. The system of claim 17, wherein the operations further comprise:
updating the aggregated device QoE based on the at least one diagnostic file received from the client device; and
analyzing the aggregated device QoE to determine at least one QoE trend.

* * * * *